(12) United States Patent
Jiang et al.

(10) Patent No.: US 9,812,732 B2
(45) Date of Patent: Nov. 7, 2017

(54) DUAL STORAGE SYSTEM AND METHOD WITH LITHIUM ION AND LEAD ACID BATTERY CELLS

(71) Applicant: Johnson Controls Technology Company, Holland, MI (US)

(72) Inventors: Junwei Jiang, Glendale, WI (US); Bernhard M. Metz, Milwaukee, WI (US)

(73) Assignee: Johnson Controls Technology Company, Holland, MI (US)

( * ) Notice: Subject to any disclaimer, the term of this patent is extended or adjusted under 35 U.S.C. 154(b) by 702 days.

(21) Appl. No.: 14/106,663

(22) Filed: Dec. 13, 2013

(65) Prior Publication Data

US 2015/0050527 A1 Feb. 19, 2015

Related U.S. Application Data

(60) Provisional application No. 61/866,786, filed on Aug. 16, 2013.

(51) Int. Cl.
*H01M 10/0525* (2010.01)
*H01M 10/06* (2006.01)
(Continued)

(52) U.S. Cl.
CPC ....... *H01M 10/0525* (2013.01); *H01M 10/06* (2013.01); *H01M 10/425* (2013.01); *H01M 10/441* (2013.01); *H01M 10/486* (2013.01); *H01M 16/00* (2013.01); *H01M 4/405* (2013.01); *H01M 4/485* (2013.01); *H01M 10/056* (2013.01); *H01M 2010/4271* (2013.01);

*H01M 2220/20* (2013.01); *Y02E 60/122* (2013.01); *Y02E 60/126* (2013.01); *Y02P 70/54* (2015.11);
(Continued)

(58) Field of Classification Search
None
See application file for complete search history.

(56) References Cited

U.S. PATENT DOCUMENTS

| 5,455,638 A | 10/1995 | Kallman et al. |
| 5,587,250 A | 12/1996 | Thomas et al. |

(Continued)

FOREIGN PATENT DOCUMENTS

| CN | 101114723 | 1/2008 |
| CN | 101740803 A | * 6/2010 |

(Continued)

OTHER PUBLICATIONS

Yuasa Battery Europe Ltd (2014)—RE12-12 Features & Technical Spec http://www.yuasa.co.uk/re12-12-re12-12.html.*
(Continued)

*Primary Examiner* — Patrick Ryan
*Assistant Examiner* — Carmen Lyles-Irving
(74) *Attorney, Agent, or Firm* — Fletcher Yoder, P.C.

(57) ABSTRACT

A battery system may include a plurality of battery cell assemblies electrically coupled in series. A first battery cell assembly of the plurality of battery cell assemblies includes a first lithium ion battery cell and a first lead acid battery cell electrically coupled in parallel with the first lithium ion battery cell such that the first lead acid battery cell is configured to resist overcharging and overdischarging of the first lithium ion battery cell.

9 Claims, 7 Drawing Sheets

(51) Int. Cl.
*H01M 16/00* (2006.01)
*H01M 10/42* (2006.01)
*H01M 10/44* (2006.01)
*H01M 10/48* (2006.01)
*H01M 10/056* (2010.01)
*H01M 4/485* (2010.01)
*H01M 4/40* (2006.01)

(52) U.S. Cl.
CPC ........ *Y02T 10/7011* (2013.01); *Y02T 10/7016* (2013.01)

(56) References Cited

U.S. PATENT DOCUMENTS

| | | |
|---|---|---|
| 6,465,986 B1 | 10/2002 | Haba |
| 2003/0094928 A1 | 5/2003 | Emori et al. |
| 2004/0053083 A1 | 3/2004 | Kobayashi et al. |
| 2004/0201365 A1 | 10/2004 | Dasgupta et al. |
| 2005/0191528 A1 | 9/2005 | Cortes et al. |
| 2007/0104981 A1 | 5/2007 | Lam et al. |
| 2008/0199737 A1 | 8/2008 | Kazaryan et al. |
| 2009/0123814 A1* | 5/2009 | Cabot ................ H01M 10/052 429/50 |
| 2009/0239148 A1* | 9/2009 | Jiang .................... H01M 4/131 429/221 |
| 2009/0274849 A1* | 11/2009 | Scott .................... H01M 4/485 427/457 |
| 2010/0025132 A1* | 2/2010 | Hill ........................ B60K 1/04 180/65.29 |
| 2010/0253147 A1 | 10/2010 | Ogg |
| 2012/0013189 A1* | 1/2012 | Jenkins ..................... H02J 1/14 307/80 |
| 2012/0169129 A1 | 7/2012 | Kim et al. |
| 2012/0235473 A1 | 9/2012 | Jiang et al. |
| 2012/0235642 A1 | 9/2012 | Mao et al. |
| 2012/0237799 A1 | 9/2012 | Jiang et al. |
| 2013/0229049 A1 | 9/2013 | Larsson et al. |
| 2013/0252035 A1 | 9/2013 | Lamp et al. |
| 2014/0184159 A1* | 7/2014 | Kachi .................... B60L 1/003 320/109 |

FOREIGN PATENT DOCUMENTS

| | | | |
|---|---|---|---|
| CN | 10190866 | 8/2010 | |
| CN | 101908662 | 12/2010 | |
| CN | 202067880 U | 12/2011 | |
| JP | WO 2013054795 A1 * | 4/2013 | ............. B60L 1/003 |
| WO | 03088375 | 10/2003 | |
| WO | 2003088375 | 10/2003 | |
| WO | 2011114349 | 9/2011 | |
| WO | 2013054795 A1 | 4/2013 | |

OTHER PUBLICATIONS

CN 101740803 (Hu)—Self-regulating hybrid battery of lead-acid and LiFePO4 batteries (English abstract) (Published Jun. 16, 2010).*

International Search Report and Written Opinion for PCT Application No. PCT/US2013/075471 dated Apr. 24, 2014; 13 pgs.

* cited by examiner

DUAL STORAGE SYSTEM AND METHOD WITH LITHIUM ION AND LEAD ACID BATTERY CELLS

CROSS-REFERENCE TO RELATED APPLICATIONS

This application claims priority from and the benefit of U.S. Provisional Patent Application No. 61/866,786 entitled "DUAL STORAGE SYSTEM DESIGN WITHOUT BMS FOR MICRO-HYBRID APPLICATION," filed on Aug. 16, 2013, which is hereby incorporated by reference in its entirety for all purposes.

BACKGROUND

The present disclosure relates generally to the field of batteries and battery modules. More specifically, the present disclosure relates to battery cells that may be used in vehicular contexts (e.g., xEVs), as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. As will be appreciated by those skilled in the art, hybrid electric vehicles (HEVs) combine an internal combustion engine propulsion system and a battery-powered electric propulsion system, such as 48 volt or 130 volt systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operate at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12 volt systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of PHEVs.

As xEV technology continues to evolve, there is a need to provide improved power sources (e.g., battery systems or modules) for such vehicles. For example, it is desirable to increase the distance that such vehicles may travel without the need to recharge the batteries. Additionally, it may also be desirable to improve the performance of such batteries and to reduce the cost associated with the battery systems.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

The present disclosure relates to batteries and battery modules. More specifically, the present disclosure relates to lead acid battery cells used in conjunction with lithium ion battery cells to form a dual storage battery system. The dual storage battery system may be used in vehicular contexts (e.g., xEVs) as well as other energy storage/expending applications (e.g., energy storage for an electrical grid).

For example, in one embodiment, a battery system includes a plurality of battery cell assemblies electrically coupled in series. A first battery cell assembly of the plurality of battery cell assemblies includes a first lithium ion battery cell; and a first lead acid battery cell electrically coupled in parallel with the first lithium ion battery cell such that the first lead acid battery cell is configured to resist overcharging and overdischarging of the first lithium ion battery cell.

As another example, in an embodiment, a system includes a first lithium ion battery cell and a first lead acid battery cell. The first lithium ion battery cell is electrically connected in parallel with the first lead acid battery cell, and the first lithium ion battery cell and the first lead acid battery cell are together connected in series to a second lithium ion battery cell electrically coupled in parallel with a second lead acid battery cell.

As a further example, in another embodiment, a battery includes a plurality of lithium ion battery cells and a plurality of lead acid battery cells. Each individual lithium ion battery cell of the plurality of lithium ion battery cells is electrically coupled in parallel with and substantially voltage matched with a corresponding individual lead acid battery cell of the plurality of lead acid battery cells such that the battery includes a plurality of lithium ion/lead acid battery cell pairs.

DRAWINGS

These and other features, aspects, and advantages of the present disclosure will become better understood when the following detailed description is read with reference to the accompanying drawings in which like characters represent like parts throughout the drawings, wherein.

Figure 3:
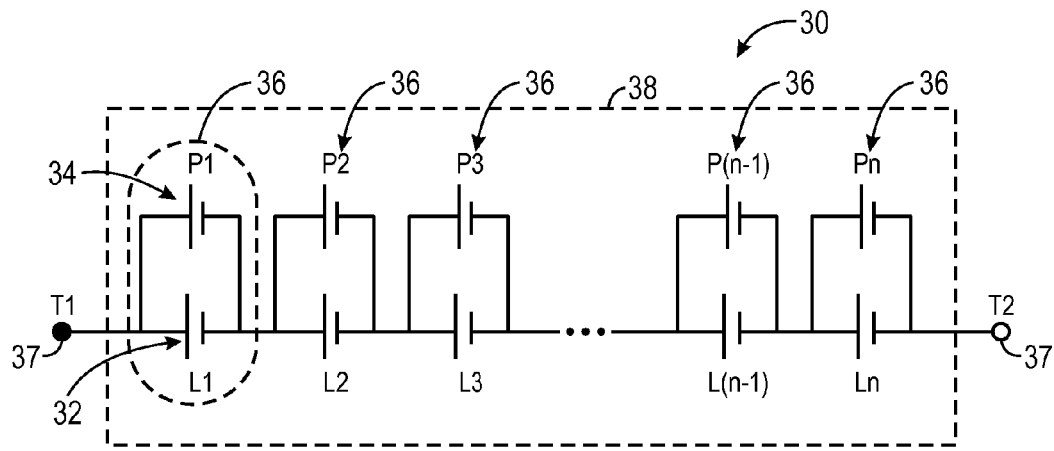
FIG. 3 is a simplified schematic of a battery having a plurality of battery cell assemblies, each assembly having a lead acid battery cell electrically coupled in parallel with a lithium ion battery cell, in accordance with an embodiment of the present approach.
Figure 4:
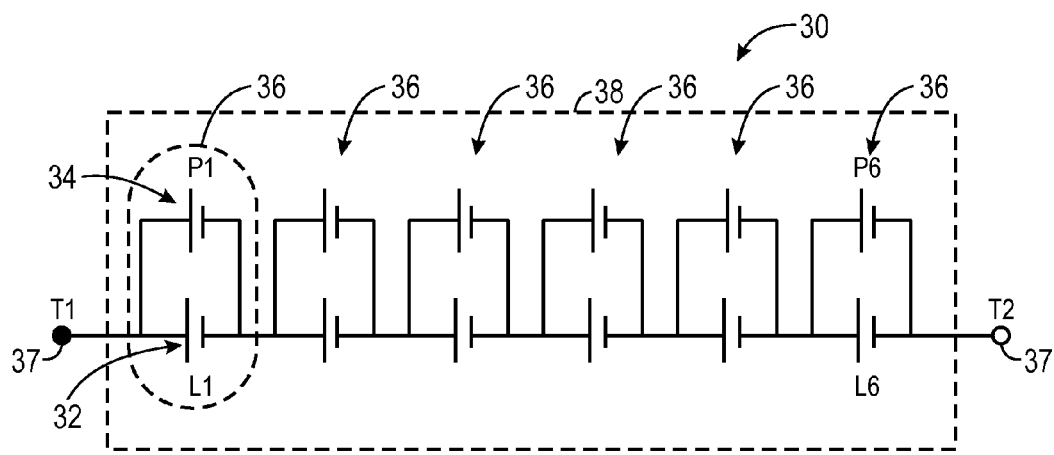
FIG. 4 is an embodiment of the battery of FIG. 3 having six battery cell assemblies, in accordance with an embodiment of the present approach.
Figure 9:
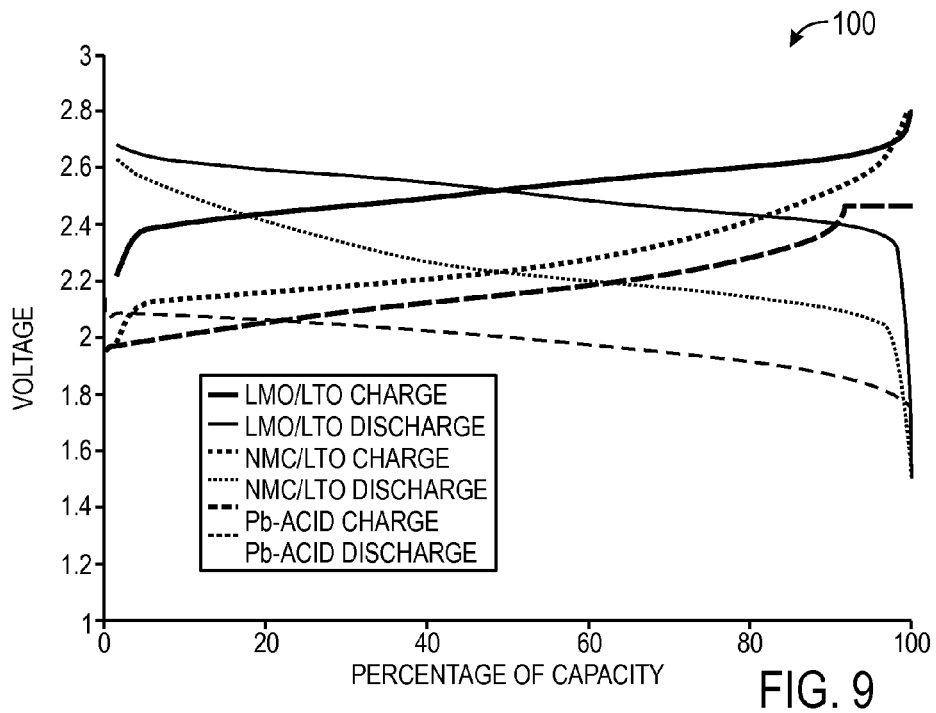
Figure 10:
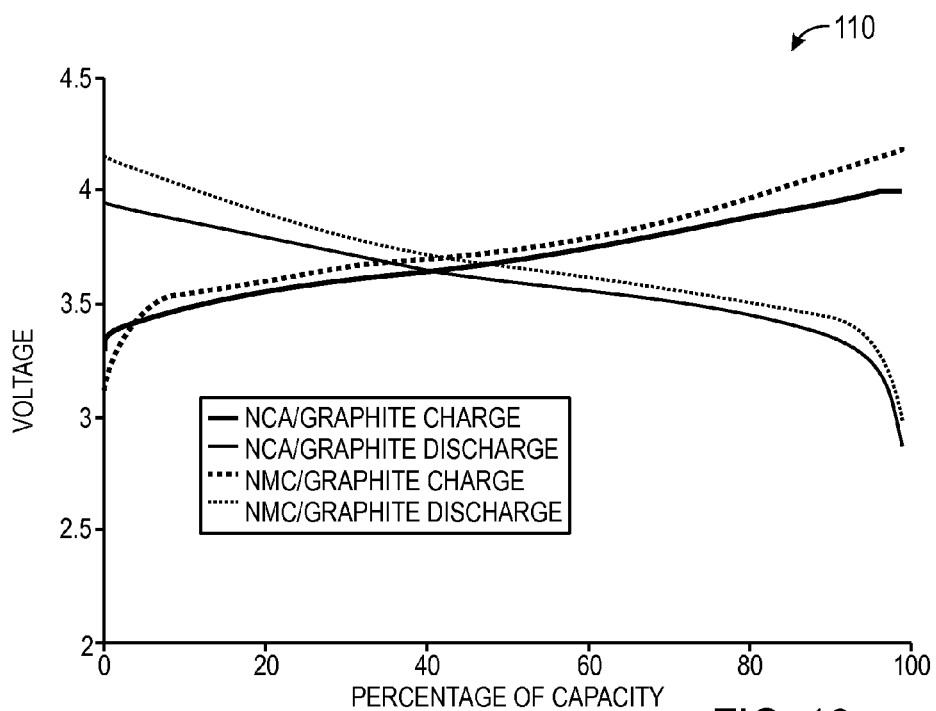
Figure 11:
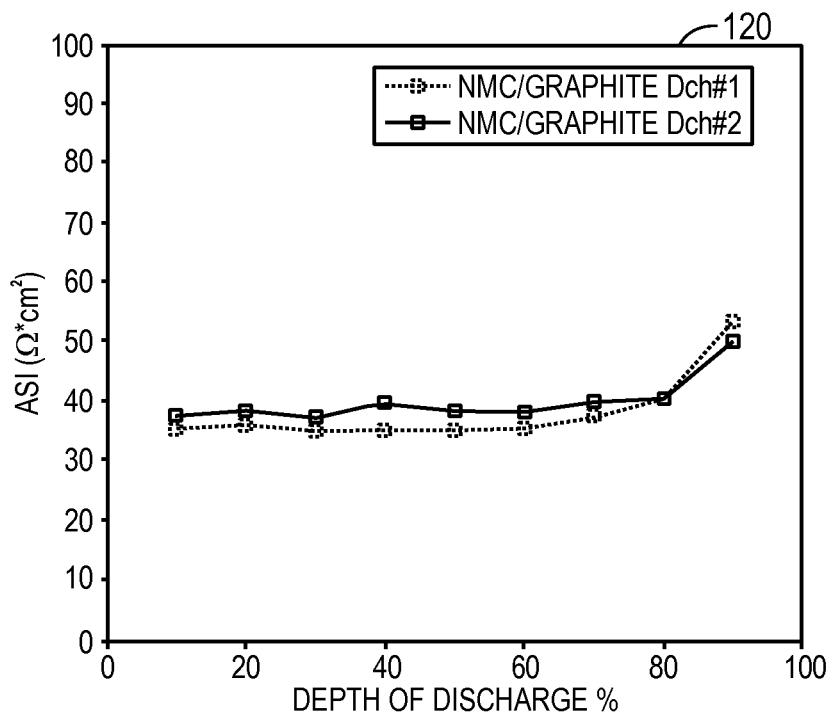
Figure 12:
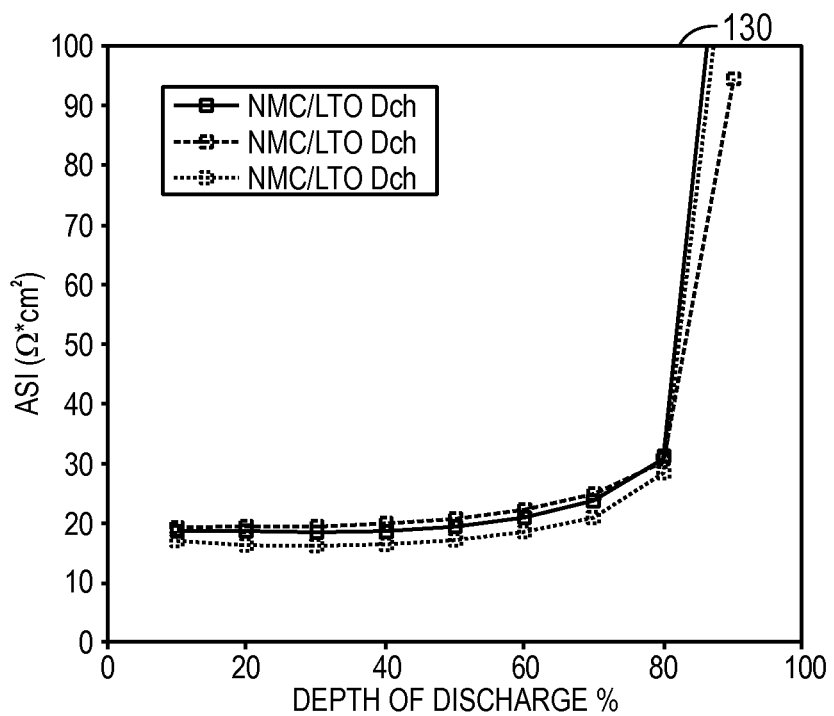
Figure 13:
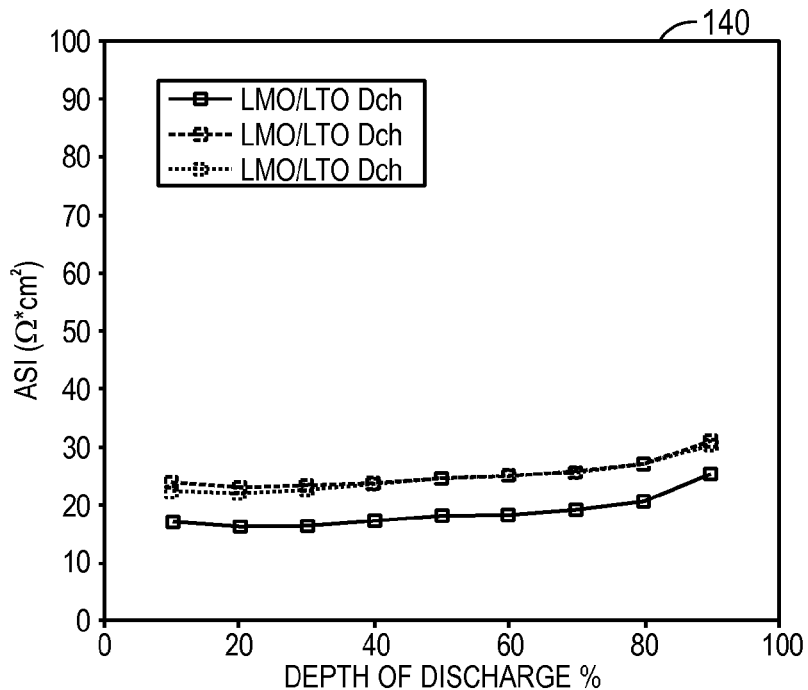
Figure 15:
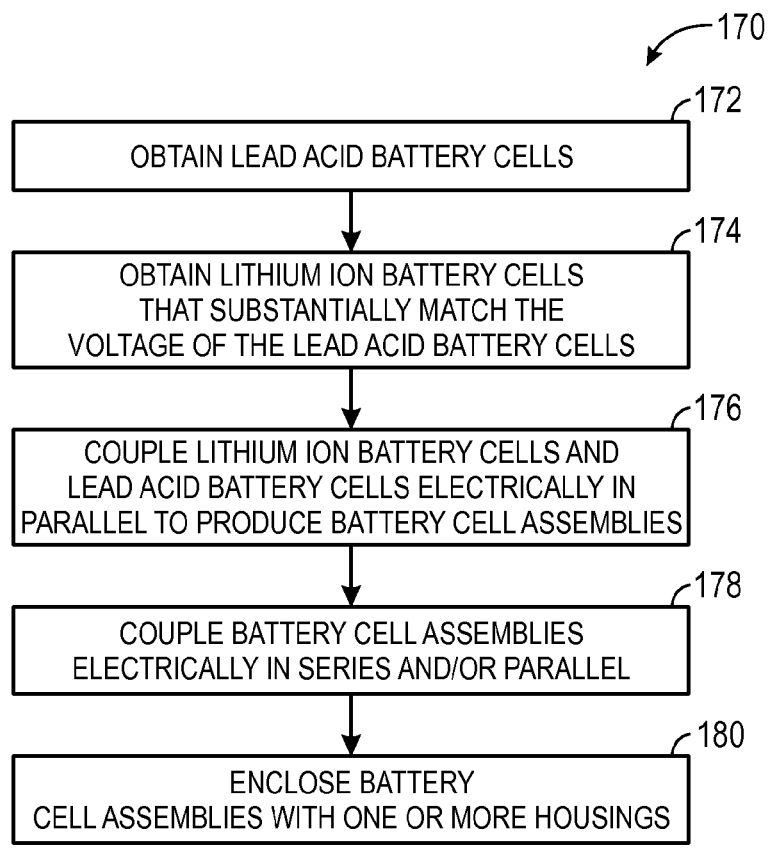
Figure 14:
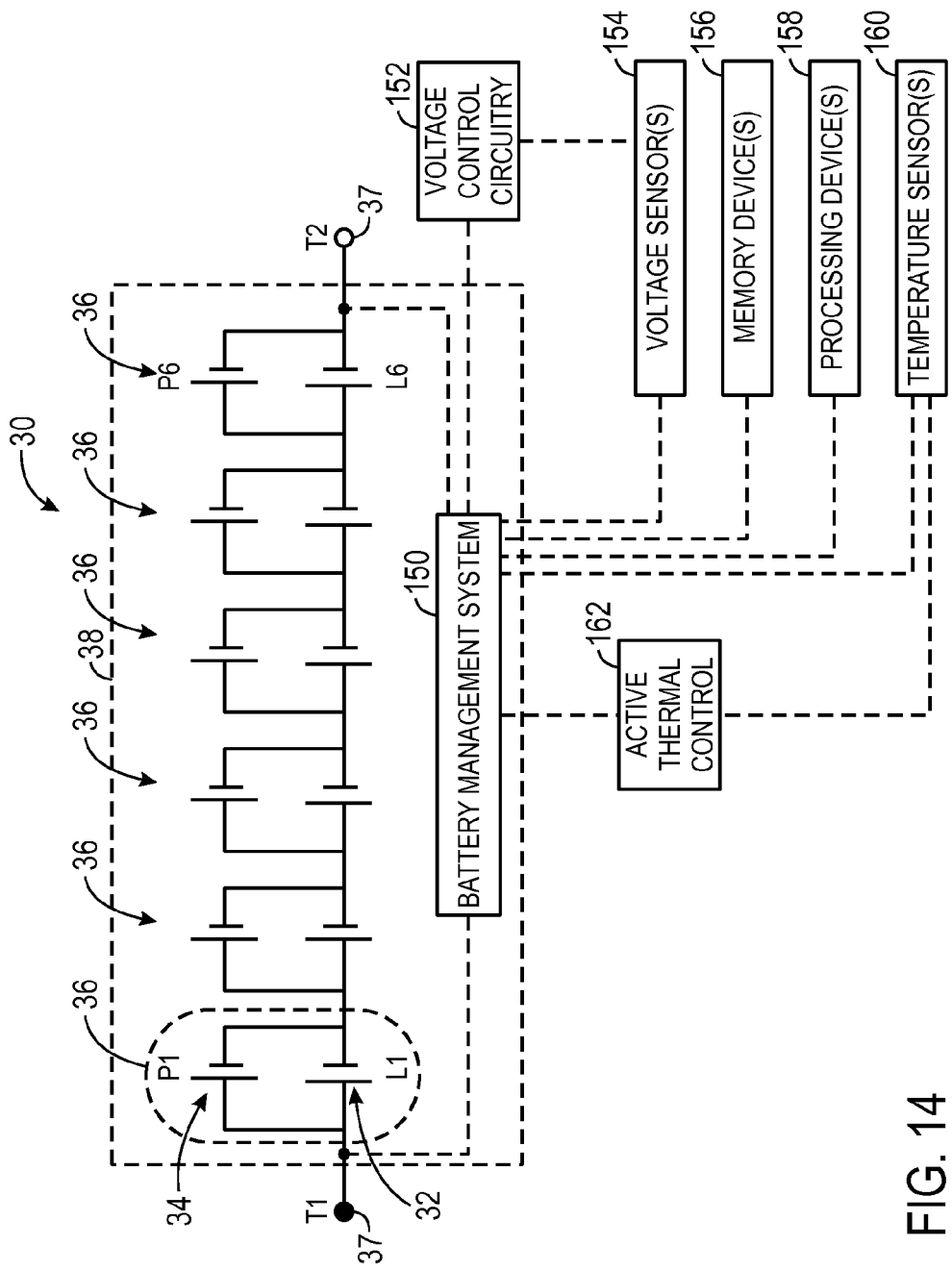

FIG. 9 is a combined plot of voltage as a function of percent capacity, at a charge/discharge rate of C/10 at 25° C., of various lithium ion battery cells having different cathode active materials used in combination with a lithium titanium oxide ($Li_4Ti_5O_{12}$, "LTO") anode active material, and voltage as a function of percent capacity for lead acid battery cells, in accordance with an embodiment of the present approach;

FIG. 10 is a combined plot of voltage as a function of state of charge, at a charge/discharge rate of C/10 at 25° C., of various lithium ion battery cells having different cathode active materials used in combination with graphite as the anode active material, in accordance with an embodiment of the present approach;

FIG. 11 is a plot of area specific impedance (ASI) as a function of state of charge obtained at 25° C. for a lithium ion battery cell having a lithium nickel manganese cobalt ($LiNi_{1/3}Co_{1/3}Mn_{1/3}O_2$, "NMC") cathode active material and a graphite anode active material, where the impedance calculations are based on a 5C discharge rate and 3.75C charge pulses for 10 seconds, in accordance with an embodiment of the present approach;

FIG. 12 is a plot of ASI as a function of state of charge obtained at 25° C. for a lithium ion battery cell having an NMC ($LiNi_{1/3}Co_{1/3}Mn_{1/3}O_2$) cathode active material and an LTO anode active material, where the impedance calculations are based on a 5C discharge rate and 3.75C charge pulses for 10 seconds, in accordance with an embodiment of the present approach;

FIG. 13 is a plot of ASI as a function of state of charge obtained at 25° C. for a lithium ion battery cell having a lithium manganese oxide ($LiMn_2O_4$, "LMO") cathode active material and an LTO anode active material, where the impedance calculations are based on a 5C discharge rate and 3.75C charge pulses for 10 seconds, in accordance with an embodiment of the present approach;

FIG. 14 is a schematic of an embodiment of the battery of FIG. 4 incorporating a simplified battery management system, in accordance with an embodiment of the present approach; and FIG. 15 is a process flow diagram depicting an embodiment of a method for manufacturing the battery of FIGS. 3-6 and 14, in accordance with an embodiment of the present approach.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. The term "consisting of," when used in the context of a mixture of materials, is intended to be defined as limiting the recited components to those specifically recited, except for impurities ordinarily associated with the recited materials. The term "consisting essentially of" is intended to be defined as being limited to the specified materials or steps that do not materially affect the basic and novel approaches described herein. Additionally, it should be understood that references to "one embodiment" or "an embodiment" of the present disclosure are not intended to be interpreted as excluding the existence of additional embodiments that also incorporate the recited features.

As mentioned, battery systems may be used to provide power to a number of different types of xEV's as well as other energy storage applications (e.g., electrical grid power storage systems). Such battery systems may include a number of battery modules, each battery module having a number of battery cells (e.g., electrochemical cells). The battery modules may also be referred to as batteries because, as known to those of skill in the art, batteries may include one battery cell or a collection of many battery cells (e.g., electrically coupled in parallel, series, or a combination thereof).

In accordance with the present disclosure, one or more of the battery modules (batteries) may include battery cell assemblies that are electrically connected in series. At least one of the battery cell assemblies, such as one or more, or all, of the battery cell assemblies, may include a lithium ion battery cell electrically coupled in parallel with a lead acid battery cell. More specifically, the lead acid battery cells may each be electrically coupled in parallel with a number of lithium ion battery cells that, together, have a total voltage substantially the same as the lead acid battery cell. As an example, a lead acid battery cell having a voltage of 2.2 Volts (V) may be electrically coupled in parallel with one lithium ion battery cell having a voltage of approximately 1.9 V, or may be electrically coupled in parallel with two lithium ion battery cells each having a voltage of 1.1 V.

Indeed, several embodiments are described below that present various lithium ion cells that are referred to as "substantially voltage matched" with a lead acid battery cell. This is intended to denote that the voltage (e.g., the open circuit voltage) of the lithium ion battery cell, which will be electrically coupled in parallel with the lead acid battery cell, is within a range of the voltage (e.g., open circuit voltage) of the lead acid battery cell that enables the lead acid battery cell to perform charge balancing between it and the lithium ion battery cell, which is discussed in further detail below. As an example, in one embodiment "substantially voltage matched" may denote that the voltage of the lithium ion cell is within, on average based on a charge or discharge curve of voltage versus percent capacity, approximately 20% of the voltage of the lead acid battery cell to which it is electrically coupled in parallel. For example, a lithium ion battery cell may be substantially voltage matched with a lead acid battery cell in a situation where the lithium ion battery cell, on average, has a voltage that is within approximately 20% of the voltage of the lead acid battery cell in a plot of voltage versus percentage of capacity (e.g., within approximately 15%, within approximately 10%, or within approximately 5% of the voltage of the lead acid battery cell in a plot of voltage versus percentage of capacity). The plot may be obtained at any temperature and at any charge/discharge rate, such as at a rate of 10C, 5C, 2C, 1C, C/2, C/5, C/10, or any other rate. The particular rate and temperature chosen may be selected based on a number of factors, such as a typical operating condition under which the battery cell may be placed (e.g., typical automotive charge/discharge rates), or other standard measurement rates for a particular application. In situations where more than one lithium ion battery cell is electrically coupled in parallel with a single lead acid battery cell, the total voltage of the two lithium ion battery cells may be within a range that enables the single lead acid battery cell to perform the charge balancing discussed herein. In other situations where two or more lead acid battery cells are electrically coupled in parallel with a single lithium ion battery cell, the total voltage of the two lead acid battery cells may be within a range that enables the single lithium-ion battery cell to perform the charge balancing.

The parallel connection between the lithium ion battery cell and the lead acid battery cell results in a configuration in which the lead acid battery cell enables protection of the lithium ion battery cell to which it is electrically coupled in parallel from effects resulting from overdischarging and overcharging. In accordance with the present disclosure, this protection may enable a reduction in the complexity of control circuitry used to manage the lithium ion battery cells during charging and during use, or may altogether eliminate a need for such control circuitry. Such circuitry, as discussed herein, may be referred to as a "battery management system" (BMS). Therefore, in accordance with present embodiments, the batteries described herein may be configured to operate with or without the control of a BMS. For instance, the batteries may undergo charge balancing during operation without being controlled by a BMS.

It may be undesirable to completely discharge lithium ion batteries, and, furthermore, it may be undesirable to overcharge lithium ion batteries. For example, it may be difficult to re-charge overly discharged lithium ion batteries (e.g., to restore them to their original, fully charged state), whereas overly charged lithium ion batteries may become hot, and, in some instances, may not have stable operation. To prevent such overdischarging and overcharging, typical lithium ion batteries include a BMS that controls each and every lithium ion battery cell during use and during charging.

For example, a BMS may be employed in a cellular telephone powered by a lithium ion battery. In this example, when the lithium ion battery cell or cells approach a particular level of charge (e.g., the battery is at a low charge level), the BMS may cause the cellular phone to turn off. On the other hand, when the lithium ion battery is charging and has reached a fully charged state (or some other predetermined level of charge), such as when the cellular phone is left on a charger, the BMS may break the circuit between the source of charge and the lithium ion battery cell or cells, which stops the lithium ion battery from becoming overcharged. In addition, during normal operation, the BMS may control the lithium ion battery cells on a cell-to-cell basis to enable charge balancing and stable operation. The present technique may, in some embodiments, eliminate the need for such circuitry, or may simplify such circuitry.

As another example, in certain electric vehicles, some battery modules may include nearly 300 lithium ion battery cells, which are individually controlled to prevent overcharging and overdischarging, as well as to maintain the temperature of each cell within a desired operating range. The circuitry used to control these cells can add significant cost to the battery modules and introduce additional elements for potential failure. Accordingly, it should be appreciated that reducing or altogether removing cell management features, for example by using one BMS that controls the entire battery module, or groups of cells, as opposed to controlling individual cells, may significantly reduce cost and can enhance reliability if properly implemented.

The present approaches may be used to produce a battery that can be utilized in a variety of contexts. However, the present embodiments will be discussed below in the context of vehicles that utilize lead acid batteries and lithium ion batteries. In accordance with the present disclosure, any voltage may be achieved using a plurality of the battery cell assemblies discussed below. For example, voltages between approximately 4 V and 150 V may be appropriate for certain contexts, such as for incorporation into an xEV. As a more specific example, voltages between 8V and 60V may be suitable for use in an xEV.

In accordance with the present disclosure, batteries that incorporate the battery cell assemblies of the present disclosure may not require systems to include separate batteries that are used for cranking (e.g., cold cranking) and charging (e.g., energy storage). Rather, batteries produced in accordance with the present disclosure may each include characteristics of lead acid batteries (e.g., discharge rates suitable for cranking) as well as characteristics of lithium ion batteries (e.g., faster charge rates and better charge retention compared to lead acid batteries). For at least this reason, among others discussed below, in one embodiment, the batteries produced in accordance with the present disclosure may be have different characteristics than full lead acid batteries (e.g., including a plurality of lead acid battery cells) electrically coupled in parallel with full lithium ion batteries (e.g., including a plurality of lithium ion battery cells), and may have different characteristics compared to these individual batteries.

Figure 1:
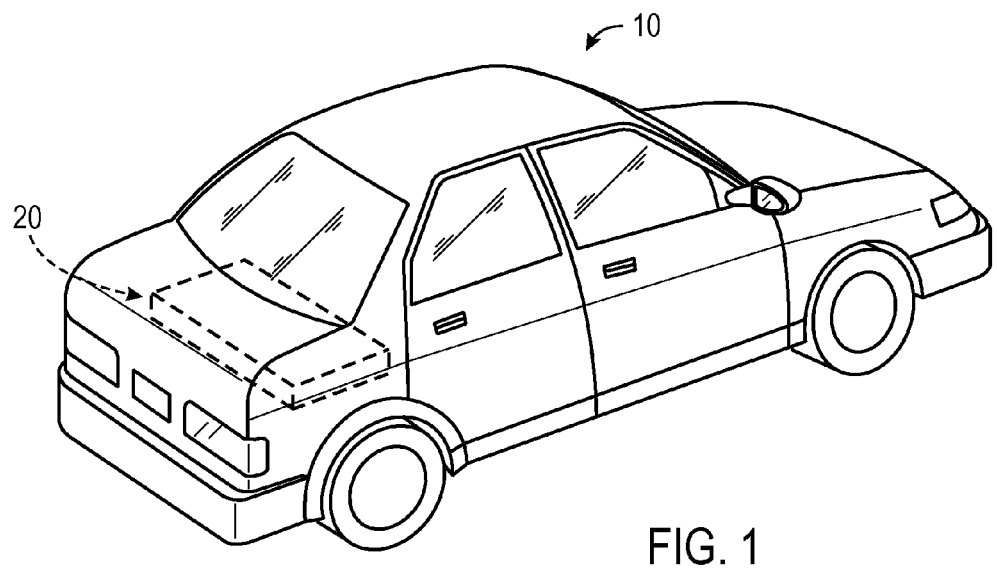
FIG. 1 is a perspective view of a vehicle (an xEV) having a battery system contributing all or a portion of the power for the vehicle, in accordance with an embodiment of the present approach.

The battery cell assemblies of the present disclosure, as noted above, may be incorporated into a battery that is integrated into the framework of an xEV. With the foregoing in mind, FIG. 1 is a perspective view of an xEV 10 in the form of an automobile (e.g., a car) having a battery system 20 in accordance with present embodiments for providing all or a portion of the power (e.g., electrical power and/or motive power) for the vehicle 10, as described above. Although the xEV 10 may be any of the types of xEVs described above, by specific example, the xEV 10 may be a mHEV, including an internal combustion engine equipped with a microhybrid system which includes a start-stop system that may utilize the battery system 20 to power at least one or more accessories (e.g., AC, lights, consoles, etc.), as well as the ignition of the internal combustion engine, during start-stop cycles. In addition, the battery system 20, incorporating battery cell assemblies having lead acid battery cells and lithium ion battery cells, may also be used for cold cranking of the internal combustion engine, which may require high discharge rates.

Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power. Additionally, while the battery system 20 is illustrated in FIG. 1 as being positioned in the trunk or rear of the vehicle, according to other embodiments, the location of the battery system 20 may differ. For example, the position of the battery system 20 may be selected based on the available space within a vehicle, the desired weight balance of the vehicle, the location of other components used with the battery system 20 (e.g., battery management systems, vents or cooling devices, etc.), and a variety of other considerations.

Figure 2:
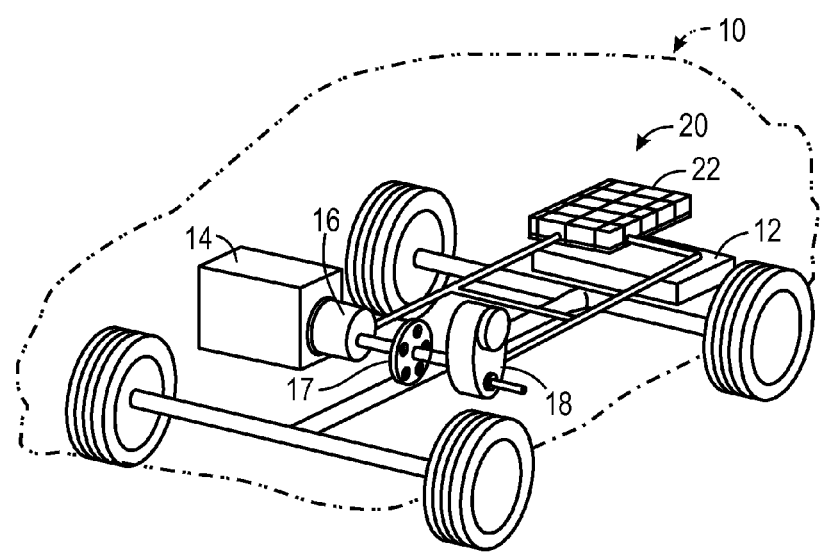
FIG. 2 is a cutaway schematic view of the xEV embodiment of FIG. 1 in the form of a hybrid electric vehicle (HEV), in accordance with an embodiment of the present approach.

FIG. 2 illustrates a cutaway schematic view of an embodiment of the xEV 10 of FIG. 1, provided in the form of an HEV having the battery system 20, which includes one or more battery modules 22. In particular, the battery system 20 illustrated in FIG. 2 is disposed toward the rear of the vehicle 10 proximate a fuel tank 12. In other embodiments, the battery system 20 may be provided immediately adjacent the fuel tank 12, provided in a separate compartment in the rear of the vehicle 10 (e.g., a trunk), or provided in another suitable location in the xEV 10. Further, as illustrated in FIG. 2, an internal combustion engine 14 may be provided for times when the xEV 10 utilizes gasoline power to propel the vehicle 10. The vehicle 10 also includes an electric motor 16, a power split device 17, and a generator 18 as part of the drive system.

The xEV vehicle 10 illustrated in FIG. 2 may be powered or driven by the battery system 20 alone, by the combustion engine 14 alone, or by both the battery system 20 and the engine 14. It should be noted that, in other embodiments of the present approach, other types of vehicles and configurations for the vehicle drive system may be utilized, and that the schematic illustration of FIG. 2 should not be considered as limiting the scope of the subject matter described in the present application. According to various embodiments, the size, shape, and location of the battery system 20, the type of vehicle, the type of xEV technology, and the battery chemistry, among other features, may differ from those shown or described.

The battery system 20 may generally include one or more battery modules 22, each having a plurality of battery cells (e.g., lithium ion battery cells that are each electrically coupled in parallel with respective lead acid battery cells), which are discussed in greater detail below. The battery system 20 may include features or components for connecting the multiple battery modules 22 to each other and/or to other components of the vehicle electrical system. For example, the battery system 20 may include features that are responsible for monitoring and controlling the electrical and thermal performance of the one or more battery modules 22. As noted above, however, the battery system 20, in some embodiments, may not include a battery management system (BMS) or thermal management system that controls the battery modules 22. In other embodiments, the battery system 20 may include a simplified BMS that controls each battery module 22, rather than controlling the individual cells of the modules 22. Similarly, in some embodiments, little to no temperature control features may be utilized to control the temperature of the battery modules 22. For example, rather than including a temperature sensor (e.g., a thermocouple) and other cooling features for every lithium ion battery cell, the battery system 20 may include temperature sensors that monitor all of the battery cells of the battery modules 22, or collections of lithium ion battery cells (e.g., two or more battery cell assemblies). Further, the enhanced temperature stability of the present battery modules 22 may, in some embodiments, obviate the need for active and/or passive cooling, such as cooling via heat exchange/heat rejection (e.g., with a cooling fluid and/or with forced air cooling), cooling via thermally insulative materials, or any combination of these and other features.

In accordance with the present disclosure, the benefits noted above may be achieved by electrically coupling the lithium ion battery cells and the lead acid battery cells according to a particular configuration, and also by constructing the lithium ion battery cells from materials that are chosen to have stable operation under a wide variety of conditions. Example embodiments of the various connection methods that may be utilized are discussed in detail below with respect to FIGS. 3-6, a discussion of the manner in which the lead acid battery cells and the lithium ion battery cells operate in parallel is discussed below with respect to FIGS. 7 and 8, and example materials that may be used to construct the lithium ion battery cells are discussed below with respect to FIGS. 9-13.

Electrical Configuration of the Battery

FIG. 3 depicts an embodiment of a battery 30 (e.g., one of the battery modules 22, or a collection of the battery modules 22), which includes a plurality of lithium ion battery cells 32 (L1-Ln) electrically coupled in parallel with lead acid battery cells 34 (P1-Pn). More specifically, the battery 30 of FIG. 3 includes electrically parallel pairs of the lead acid battery cells 34 and lithium ion battery cells 32 that form a plurality of battery cell assemblies 36, which are in turn electrically coupled in series with one another. Accordingly, in the illustrated embodiment, the overall voltage of the battery 30 is the sum of the individual voltages of the battery cell assemblies 36.

The illustrated battery cell assemblies 36 each include a single lithium ion battery cell that is electrically coupled in parallel with a single lead acid battery cell. Thus, each of the battery cell assemblies 36 includes two different types of battery cells (i.e., cells with different electrochemistry), and may be referred to as dual storage batteries/battery systems. In the illustrated embodiment, each battery cell assembly 36 includes only one lithium ion battery cell and only one lead acid battery cell. For example, referring to the left-most battery cell assembly in FIG. 3, a first lithium ion battery cell L1 is electrically coupled in parallel with only a first lead acid battery cell P1. These two, together, are in turn electrically connected in series to a second one of the battery cell assemblies 36 including a second lead acid battery cell P2 and a second lithium ion battery cell L2, which are electrically coupled in parallel with one another. The same can be said for the remainder of the pairs of lead acid and lithium ion battery cells of the battery cell assemblies 36 depicted.

Stated differently, the battery 30 includes the plurality of lithium ion battery cells 32 that are electrically connected in series with one another, and each individual lithium ion battery cell 32 is electrically coupled in parallel with a separate one of the lead acid battery cells 34. This configuration may also be true from the standpoint of the lead acid battery cells 34. Thus, the battery 30 includes the plurality of lead acid battery cells 34, which are electrically coupled in series with one another, and each individual one of lead acid battery cells 34 is electrically coupled in parallel with a separate one of the lithium ion battery cell 32.

In accordance with present embodiments, the first lithium ion battery cell L1 is protected, at least partially, from overdischarging and overcharging by the electrochemical nature of the first lead acid battery cell P1. In addition, the first lithium ion battery cell L1 and the first lead acid battery cell P1 are naturally balanced when placed in this electrical configuration. In this respect, the second lithium ion battery cell L2 is at least partially protected by and may be charge balanced with the second lead acid battery cell P2, a third lithium ion battery cell L3 of the battery 30 is at least partially protected by and may be charge balanced with a third lead acid battery cell P3 of the battery 30, and so on.

In FIG. 3, the battery 30 includes n battery cell assemblies 36, where n represents an integer between 1 and, for example, 70. The total voltage of the battery 30 is the sum of the voltages of the battery cell assemblies 36 electrically connected to one another in series. Therefore, in embodiments where the voltage of each of the battery cell assemblies 36 is substantially the same, the total voltage of the battery 30 will be the voltage of each of the battery cell assemblies 36 multiplied by n. In one embodiment, the battery cell assemblies 36 may be considered to have substantially the same voltage output if their average voltage is within 0.1V of one another. In the illustrated embodiment, for example, where each battery cell assembly 36 has a voltage of approximately 2.2 V, the total voltage, measured across terminals 37, depicted as a first terminal T1 and a second terminal T2 of the battery 30, may be 2.2 V multiplied by n.

Figure 5:
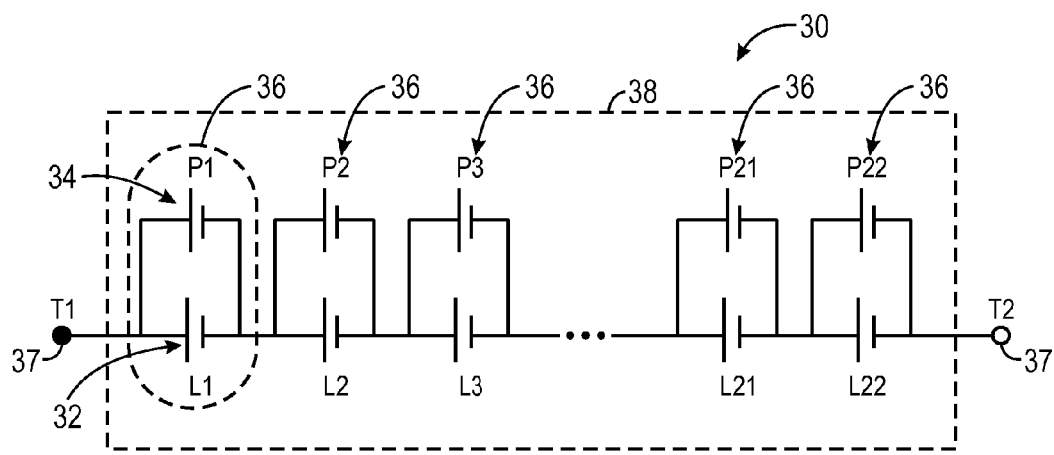
FIG. 5 is an embodiment of the battery of FIG. 3 having 22 battery cell assemblies, in accordance with an embodiment of the present approach.

Therefore, in the configuration illustrated in FIG. 4, to produce a 12 V battery, n may be 6 (the total voltage will be approximately 13.2 V). To produce a 48 V battery, as depicted in FIG. 5, n may be 22 (the total voltage will be approximately 48.4 V), and to produce a 60 V battery, n may be 28 (the total voltage will be approximately 61.6 V). Again, any voltage may be produced in accordance with the present disclosure. By way of further example, the total voltage of the battery 30 may be between approximately 4 V and approximately 150 V, such as less than 60 V (e.g., between approximately 8 V and approximately 48 V), with an appropriate value for n being selected for the desired voltage output.

Returning to FIG. 3, the battery 30, as noted above, includes the first terminal T1 and the second terminal T2, which may be positive and negative, respectively, or negative and positive, respectively. Further, while illustrated as having only two terminals, the battery 30 may have any number of terminals as appropriate, depending on the particular implementation of the battery 30 and the particular electrical connectivity chosen for the battery cell assemblies 36. Indeed, various embodiments of the battery 30 may have 2, 3, 4, or more terminals.

It may be desirable for the battery cell assemblies 36 to only be accessible via the first and second terminals T1, T2, for example to prevent inadvertent electrical connections between the assemblies 36 and other circuitry, or to prevent exposure of the battery cell assemblies 36 to conditions (e.g., materials) that might degrade their performance. Thus, it may be desirable to provide the battery 30 as a one-box solution for a particular implementation (e.g., in a vehicle). The embodiments of the battery 30 depicted in FIGS. 3-5 include a single housing 38 for all of the battery cell assemblies 36. In some embodiments, because the assemblies 36 are all enclosed within the housing 38, the only points at which the battery cell assemblies 36 may be accessed or addressed are via the first and second terminals T1 and T2, and may therefore be isolated from external environmental conditions.

Figure 6:
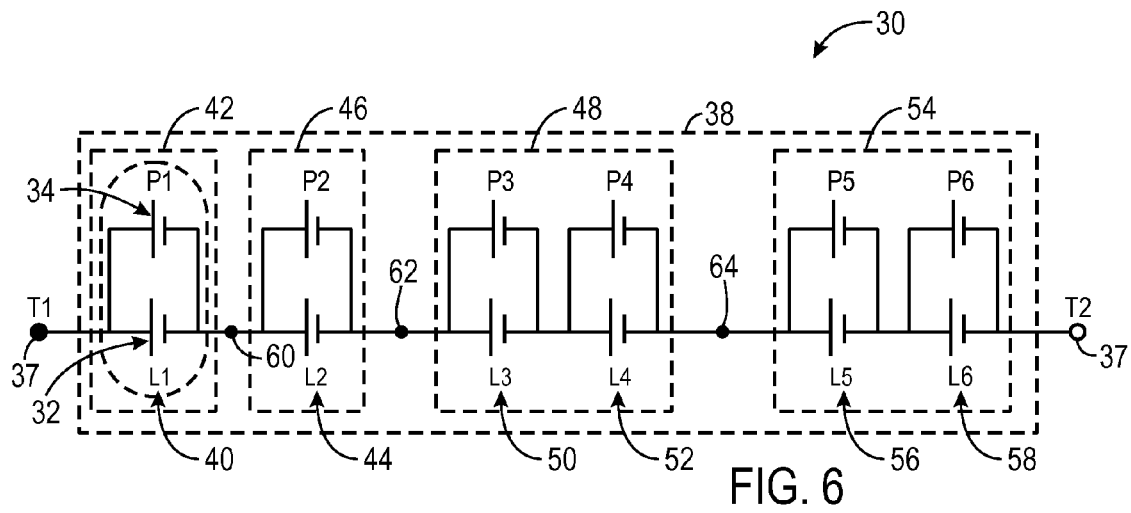
FIG. 6 is an embodiment of the battery of FIG. 3 having two or more housings, each housing enclosing one or more battery cell assemblies, in accordance with an embodiment of the present approach.

In further embodiments, as depicted in FIG. 6, the battery 30 may include assembly housings, which may be used in addition to, or in lieu of, the main battery housing 38. Specifically, the embodiment of the battery 30 depicted in FIG. 6 includes a first battery cell assembly 40 having the first lithium ion battery cell L1 and the first lead acid battery cell P1 electrically coupled in parallel with one another. The first battery cell assembly 40 is enclosed by a first assembly housing 42, and is electrically coupled in series with a second battery cell assembly 44 having a second lithium ion battery cell L2 and a second lead acid battery cell P2 electrically coupled in parallel with one another. Thus, the electrical connectivity between the first and second battery cell assemblies 40, 44, is the same as set forth in FIGS. 3-5, but the second battery cell assembly 44 is enclosed in a separate, second assembly housing 46.

The first and second assembly housings 42, 46 each enclose a single battery cell assembly—the first and second battery cell assemblies 40, 44, respectively. However, other housings that enclose more than one (e.g., two, three, four, or more) battery cell assembly may also be used. Furthermore, housings that enclose only the lead acid battery cells 34 and housings that enclose only the lithium ion battery cells 32, may also be used.

As illustrated, the battery 30 also includes a third assembly housing 48, which encloses a third battery cell assembly 50 and a fourth battery cell assembly 52 (i.e., two battery cell assemblies). The third battery cell assembly 50 includes a third lithium ion battery cell L3 and a third lead acid battery cell P3, and the fourth battery cell assembly 52 includes a fourth lithium ion battery cell L4 and a fourth lead acid battery cell P4. Similarly, a fourth assembly housing 54 of the battery 30 encloses a fifth battery cell assembly 56 and a sixth battery cell assembly 58 (i.e., two battery cell assemblies). The fifth battery cell assembly 56 includes a fifth lithium ion battery cell L5 and a fifth lead acid battery cell P5, and the sixth battery cell assembly 58 includes a sixth lithium ion battery cell L6 and a sixth lead acid battery cell P6.

The battery 30 also includes electrical interconnections between the assemblies contained within the assembly housings. This manner of connection may enable additional modularity for the battery 30, which in turn enables the production of batteries in a variety of different voltages. For example, the battery 30 of FIG. 6 includes a first electrical interconnection 60 between the battery cell assemblies 40, 44 of the first and second assembly housings 42, 46, respectively, a second electrical interconnection 62 between the battery cell assemblies 40, 50 and 52 of the second and third assembly housings 46, 48, respectively, and a third electrical interconnection 64 between the battery cell assemblies 50 and 52, 56 and 58, of the third and fourth assembly housings 48, 54, respectively. The electrical interconnections 60, 62, 64 may be formed by electrically connecting, in series, respective terminals extending from the assembly housings. Therefore, the present disclosure encompasses embodiments where a variety of assembly housings (which may be similar or different), each enclosing one or more battery cell assemblies, may be connected as appropriate to obtain a desired voltage and current output for the battery 30. Indeed, some battery cell assemblies may be electrically coupled in parallel with other battery cell assemblies to increase current flow, while maintaining a particular voltage. Therefore, the present disclosure encompasses embodiments in which a plurality of battery cell assemblies, each having a lead acid battery cell electrically coupled in parallel with a lithium ion battery cell, may be connected in series, in parallel, or a combination thereof.

Individual Battery Cell Assemblies

As noted above, the battery cell assemblies 36 produced in accordance with present embodiments may each include a lead acid battery cell (e.g., the first lead acid battery cell P1) and a lithium ion battery cell (e.g., the first lithium ion battery cell L1) electrically coupled with one another in parallel. The battery cell assemblies 36 illustrated in FIGS. 3-6 are depicted as having only one lithium ion battery cell electrically coupled in parallel with only one lead acid battery cell. However, in some embodiments, any of which may be incorporated into the embodiments described above with respect to FIGS. 3-6, there may be more than one lithium ion battery cell in at least one of the battery cell assemblies 36, or more than one lead acid battery cell in at least one of the battery cell assemblies 36, or any combination thereof.

Thus, the number of lithium ion battery cells 32 relative to the number of lead acid battery cells 34 may be represented as a ratio for each of the battery cell assemblies 36. By way of non-limiting example, a ratio of lithium ion battery cells to lead acid battery cells may be 1:1. In other words, there may be one lithium ion battery cell for every lead acid battery cell, and these cells may be electrically coupled in parallel with one another.

More generally, any ratio of the lithium ion battery cells 32 to the lead acid battery cells 34 may be used. However, certain ratios and certain types of electrical matching between the lithium ion battery cells 32 and the lead acid battery cells 34 may be desirable, as discussed herein. In accordance with certain embodiments of the present disclosure, the ratio of lithium ion battery cells 32 to the lead acid battery cells 34 may be chosen such that a total voltage of the lithium ion battery cells 32 in each battery cell assembly 36 is substantially voltage matched with a total voltage of the lead acid battery cells 32. However, it should be noted that the use of multiple lithium ion batteries 32 in series in a single battery cell assembly may not be sufficiently protected by the lead acid battery cells 34 from overcharging and overdischarging. Thus, in certain of these embodiments, the total voltage of the lithium ion battery cells 32 in a single battery cell assembly may be substantially matched with a total voltage of a single lead acid battery cell. In some embodiments, this may result in a ratio of 2:1 lithium ion battery cells to lead acid battery cells, such as in configurations in which the lithium ion battery cells each have a voltage of about half of the voltage of the lead acid battery cell. On the other hand, the ratio may be 1:2 lithium ion battery cell to lead acid battery cells in configurations in which the lithium ion battery cell 32 has a voltage that is approximately double the voltage of each lead acid battery cell 34. As discussed below, this ratio may be at least partially determined by the particular materials utilized in the lithium ion battery cells 32.

In embodiments where the ratio of lead acid battery cells 34 to lithium ion battery cells 32 in a particular battery cell assembly is 1:2, all three cells may be electrically coupled to one another in parallel, or the two lithium ion battery cells 32 may be electrically coupled in series, and the series connection of the two lithium ion battery cells may be electrically coupled in parallel with the single lead acid battery cell 34. In configurations where this ratio is 2:1, the positioning of the lead acid battery cells 34 and the lithium ion battery cells 32 may be reversed, where the two lead acid battery cells 34 may be electrically coupled in parallel or series, and the two lead acid battery cells 34 may be electrically coupled in parallel to the lithium ion battery cell 32.

While any ratio of lithium ion battery cells 32 to lead acid battery cells 34 for each of the battery cell assemblies 36 may be used, it may be desirable to have a ratio of 1:1 for each of the battery cell assemblies 36 to achieve superior protection and charge balancing between the lithium ion battery cells 32 and the lead acid battery cells 34. Indeed, the electrochemistry of the first lead acid battery cell P1, as well as a degree of voltage matching between the lithium ion battery cell L1 and the first lead acid battery cell P1, may achieve this protection. Because of the manner in which this protection occurs, it may be desirable for each lithium ion battery cell 32 to be protected by a single lead acid battery cell 34, and it may be desirable for a lead acid battery cell 34 to protect only one lithium ion battery cell 32. The manner in which the lead acid battery cells 34 protect and are balanced with the lithium ion battery cells 32 is discussed in further detail below with respect to FIGS. 7 and 8. Further, it should be appreciated that in embodiments where the lithium ion battery cells 32 and the lead acid battery cells 34 are not substantially voltage matched, additional control of the lithium ion battery cells 32 may be appropriate (e.g., via a simplified BMS). Such embodiments are also encompassed by the present disclosure.

Lead Acid Battery Cell Protection of the Lithium Ion Battery Cell

To facilitate discussion of the protection of the lithium ion battery cells 32, a brief discussion of a representative lithium ion battery cell is provided herein. As will be appreciated by those of skill in the art, battery cells generally include a positive electrode (cathode) and a negative electrode (anode), and an electrochemical half-reaction occurs at each of the positive and negative electrodes of a battery cell during charging (i.e., when the battery is recharged) and discharging (e.g., when the battery is providing power). For example, the electrochemical half-reaction at the cathode of a lithium ion battery cell may be a reaction in which one or more lithium ions are reversibly (based on an equilibrium) dissociated from an active material of the cathode (typically referred to as a cathode active material), thereby also releasing one or more electrons (equal in number to the number of dissociated lithium ions). At the anode of the lithium ion battery cell, the electrochemical half-reaction that occurs may be a reaction in which one or more lithium ions and one or more electrons (of equal number) are reversibly associated with an active material of the anode (typically referred to as an anode active material). An electrolyte of the lithium ion battery cells includes a source of lithium ions to facilitate this ion shuttling.

During discharging of the battery, the equilibria at the electrodes favor dissociation of the electrons from the anode active material (an oxidation) and association of the electrons with the positive electrode active material (a reduction). In other words, during discharging, there is an electron flow from the negative to the positive electrode (e.g., through a load).

On the other hand, during charging, the reverse is true. Thus, during charging, the equilibria at the electrodes favor association of the electrons with the anode active material (reduction) and dissociation of the electrons from the cathode active material (oxidation). This causes electrons to flow from the cathode to the anode in a reverse direction compared to discharging.

During overdischarging and overcharging, additional chemical reactions may occur at the cathode active material. For example, if a lithium ion battery cell is overdischarged, the cathode active material may become oversaturated with lithium ions and electrons, which causes additional chemical reactions (e.g., additional electrochemical reduction of a transition metal in the cathode active material) to occur. On the other hand, if a lithium ion battery cell is overcharged, the cathode active material may undergo electrochemical oxidation to an extent to where there is no longer a sufficient amount of lithium present in the cathode active material to facilitate lithium association/dissociation (typically referred to as lithium intercalation and deintercalation).

Figure 7:
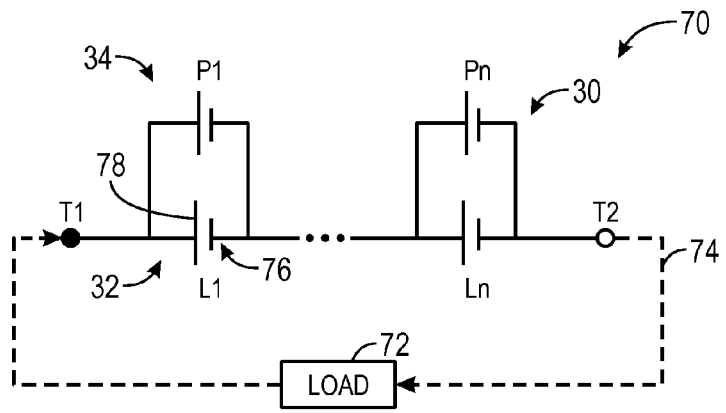
FIG. 7 is a schematic of the manner in which lead acid battery cells electrically coupled in parallel with lithium ion battery cells may be coupled to a load during discharging, in accordance with an embodiment of the present approach.

Referring now to FIG. 7, a simplified schematic 70 is provided in which the battery 30 is electrically coupled to a load 72. Various features of the battery 30 and the load 72 are not shown for clarity. During discharging, the electron flow 74 (depicted as a dashed arrow) is in the direction shown—from the second terminal T2 to the first terminal T1. This also corresponds to an electron flow from the anodes 76 of the battery cells to the cathodes 78 of the battery cells through the load 70. In accordance with present embodiments, this flow is applicable to both the lithium ion battery cells 32 and the lead acid battery cells 34. In addition, as the battery 30 discharges, the voltages across the lithium ion battery cells 32 and the lead acid battery cells 34 begins to drop (reduce in magnitude).

With respect to the first lithium ion battery cell L1 and the first lead acid battery cell P1, during discharge, there may be a buildup of electrons (i.e., electrical charge) at the cathode 78 of the first lithium ion battery cell L1, and this can result in the additional electrochemical reductions noted above if the battery 30 is overdischarged (due to an undesirably low voltage). However, because the first lithium ion battery cell L1 is electrically coupled in parallel with the first lead acid battery cell P1 in the manner illustrated in FIGS. 3-7, the first lead acid battery cell P1 may at least partially prevent the additional electrochemical reductions of the cathode active material of the first lithium ion battery cell L1 from occurring. Specifically, the first lead acid battery cell P1 undergoes its own additional electrochemical reduction at a voltage that is achieved prior to reaching the voltage that causes excessive charge buildup and appreciable degradation of the cathode active material. This may result in the first lead acid battery cell P1 shunting the voltage of the first lithium ion battery cell L1.

For example, during overdischarging, as the first lead acid battery P1 reaches a voltage of between approximately 1.3 V and approximately 1.5 V, the electrolyte of the first lead acid battery cell P1 begins to undergo an electrochemical reduction, which acts as a charge sink. This at least partially prevents the first lithium ion battery cell L1 from degrading because it prevents (or delays) the voltage across the first lithium ion battery cell L1 from dropping below a threshold voltage at which the cathode active material undergoes the undesirable electrochemical reductions.

At these voltages, excess charge buildup begins occurring at the cathode 78 of the first lithium ion battery cell L1. However, this voltage also causes the first lead acid battery cell P1 to undergo the following electrochemical reaction (1):

$$2H^+ + 2e^- \rightarrow H_2 \tag{1}$$

where hydrogen ions, present by virtue of the acid electrolyte of the first lead acid battery cell P1, undergo electrochemical reduction to produce hydrogen gas. In other words, the electrolyte of the first lead acid battery cell P1 undergoes an electrochemical reduction reaction, which serves as a sink for additional electrons/charge, thereby at least partially maintaining the voltage of and reducing charge buildup at the cathode 78 of the first lithium ion battery cell L1. In this way, the electrochemical reduction at the first lead acid battery cell P1 serves to balance the charge between the first lead acid battery cell P1 and the first lithium ion battery cell L1, in addition to protecting degradation of the first lithium ion battery cell L1.

Figure 8:
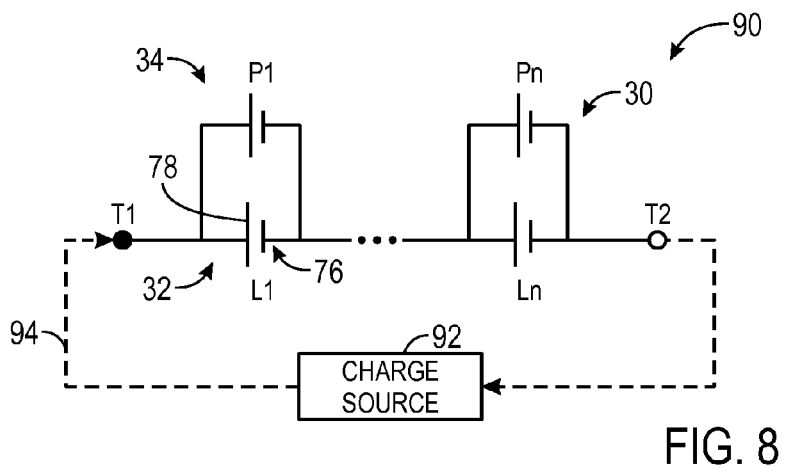
FIG. 8 is a schematic of the manner in which lead acid battery cells electrically coupled in parallel with lithium ion battery cells may be coupled to a charge source during charging, in accordance with an embodiment of the present approach.

Moving now to overcharging protection, FIG. 8 is a simplified schematic 90 depicting an example configuration of the battery 30 coupled to a charge source 92. During charging, the charge source 92 provides a sufficient voltage and current to cause an electron flow, depicted as an arrow 94, to flow in a direction from the cathodes 78 to the anodes 76 of the battery cells. Again, this electron loss at the cathodes 78 of the lithium ion battery cells 32 causes an oxidation of the cathode active material. The voltages across both the lithium ion battery cells 32 and the lead acid battery cells 34 correspondingly increase with the increasing charge.

During overcharging, as noted above, the cathode active material of the cathodes 78 of the lithium ion battery cells 32 may undergo excessive electrochemical oxidation, which can deplete the cathodes of the cathode active material that is capable of sufficient lithium intercalation/deintercalation and corresponding electron association/dissociation to maintain the operability of the lithium ion battery cells 32. In other words, during overcharging, there may be an undesirable deficit of electrons at the cathode 78 of the lithium ion battery cells 32, resulting in an undesirably high voltage across the lithium ion battery cells 32. In these situations, referring again to the first lithium ion battery cell L1 and the first lead acid battery cell P1, the electrolyte of the first lead acid battery cell P1 will undergo an additional electrochemical oxidation of its own to generate additional electrons. Specifically, once the first lead acid battery cell P1 reaches a voltage of between approximately 2.5 V and approximately 2.6 V, the water of the electrolyte of the first lead acid battery cell P1 begins to undergo an additional electrochemical oxidation, which effectively shunts the first lithium ion battery cell L1.

In other words, this output of electrons by the first lead acid battery cell P1 may, to some extent, counteract the deficit of electrons (and/or additional electrochemical oxidation) at the cathode 78 of the first lithium ion battery cell L1 by balancing the charge between them, thereby preventing degradation of the cathode active material. The reaction at the lead acid battery cell during overcharging is believed to proceed according to equation (2):

$$2H_2O \rightarrow 4H^+ + O_2 + 4e^- \qquad (2)$$

where the water is present by virtue of the acid electrolyte of the lead acid battery cell. In this way, the water in the first lead acid battery cell P1 is oxidized, which outputs electrons that can serve as a voltage shunt for the first lithium ion battery cell L1 by preventing (or delaying) the onset of over oxidation of the cathode active material.

It should be appreciated from the foregoing discussion that it may be desirable for the first lithium ion battery cell L1 and the first lead acid battery cell P1 to be substantially voltage matched. For instance, in one embodiment, the voltage matching between the first lithium ion battery cell L1 and the first lead acid battery cell P1 may ensure that the first lead acid battery cell P1 undergoes the electrochemical redox reactions of the electrolyte at voltages sufficient to protect the first lithium ion battery cell L1, and not at voltages that are too low such that the performance of the first lithium ion battery cell L1 is reduced, and not at voltages that are too high such that the protection does not occur until the cathode active material is overly degraded. In situations where there are two lithium ion battery cells 32 and a single lead acid battery cell 34, and the sum of the voltages of the two lithium ion battery cells 32 substantially match the voltage of the single lead acid battery cell 34, the single lead acid battery cell 34 may serve to balance the charge between all three cells.

Therefore, the battery cell assemblies 36 produced in accordance with the present disclosure may not, in some embodiments, require overcharge/overdischarge electronics, as noted above. In further embodiments, such overcharge/overdischarge electronics may be greatly simplified, such as by controlling groups of battery cell assemblies 36 rather than controlling individual lithium ion battery cells 32. However, the present disclosure also encompasses the use of such electronics (e.g., one or more BMS's) for each of the lithium ion battery cells 32 in addition to the parallel connection schemes discussed herein. Examples of the construction of the lead acid battery cells 34 and the lithium ion battery cells 32 are discussed in further detail below.

The Lead Acid Battery Cells

Generally, the lead acid battery cells 34 incorporated into the battery cell assemblies 36 may have any lead acid electrochemical cell construction that is suitable for use in the particular context in which the battery 30 may be used. For example, in embodiments where the battery 30 is an automotive battery, the lead acid battery cells 34 may have a construction that is appropriate for incorporation into an automobile.

As will be well-understood by those of ordinary skill in the art, each lead acid battery cell includes a cathode that incorporates lead (e.g., $PbO_2$), an anode that incorporates lead (e.g., Pb(s)), and sulfuric acid as the electrolyte. The lead acid battery cells 34 of the present disclosure, which are placed electrically in parallel with lithium ion battery cells 32, may be absorbed glass mat (AGM) lead acid battery cells, flooded lead acid battery cells, or gelled electrolyte lead acid battery cells, or any combination thereof. The gelled electrolyte and AGM lead acid battery cells may also be referred to as "sealed," "maintenance-free," or "valve-regulated" lead acid battery cells.

In AGM lead acid battery cells, for example, each cell generally includes at least one positive plate acting as the cathode, at least one negative plate acting as the anode, and a separator positioned between each positive and negative plate. The positive and negative plates are generally a lead or lead alloy grid that supports an electrochemically active material, and in particular a lead based material (e.g., PbO, $PbO_2$, Pb (s), or $PbSO_4$) pasted onto the grid. This may be referred to as the active materials of the cathode and anode of the lead acid battery cells. The AGM battery cells may also include a separator, which may be a porous glass mesh or similar structure that holds the electrolyte while enabling a small amount of electrolyte to contact the active materials of the plates for electrochemical reactions to occur.

The lead acid battery cells 34 may also incorporate certain features that are utilized to convert the hydrogen and oxygen gases produced as a result of the redox reactions described above into water. In this way, the lead acid battery cells 34 may regenerate at least a portion of the electrolyte after either or both of the redox reactions described above. For example, such features may include a catalyst (e.g., a palladium catalyst) capable of converting gaseous hydrogen and oxygen into water under particular conditions. Additional features may be utilized in conjunction with the catalyst, such as heaters, gas collectors, and so on. In some embodiments, such features used for this reaction, typically referred to as oxygen/hydrogen recombination, may be shared across different lead acid battery cells 34, may be incorporated as an internal part of each of the cells, or may be a dedicated external unit for each cell. In still further embodiments, the hydrogen, the oxygen, or both, may be vented.

The lead acid battery cells 34 will generally have a voltage (e.g., an open circuit voltage) of between approximately 2.1 V and approximately 2.3 V, depending on their particular configuration. Generally, most lead acid battery cells 34 used in automotive applications have a voltage of approximately 2.2 V. Because the voltages obtained by lead acid battery cells are generally restricted to these voltages, as noted above, the lithium ion battery cells 32 may be, in some embodiments, designed to substantially match the voltage of the lithium ion battery cells 32. However, lead acid battery cells having any voltage may be utilized in accordance with the techniques described herein.

The Lithium Ion Battery Cells

As generally set forth above, the lithium ion battery cells 32 will each generally include a cathode having a cathode active material, an anode having an anode active material, and an electrolyte that provides, among other things, a source of lithium ions and is a shuttle for carrying charge. The lithium ion battery cells 32 may be of any suitable shape and size that enables parallel electrical coupling with lead acid battery cells. For example, the lithium ion battery cells 32 may be prismatic, cylindrical, pouch-based, or any other suitable construction.

The average voltage (e.g., open circuit voltage) of each of the lithium ion battery cells 32 is generally defined by the difference between an average voltage of the cathode active material and the average voltage of the anode active material, which are in turn dependent upon the materials used for the cathode active material and the materials used for the anode active material. Thus, the number of lead acid battery cells 34 that may be suitably connected electrically in parallel with lithium ion battery cells 32 may be determined at least partially by the materials selected (and available) for the lithium ion battery cells 32. For example, when substantial voltage matching between each lithium ion battery cell and each lead acid battery cell is desired, the materials may be chosen such that the cathode active material is substantially equal to, or within a predetermined range of, the sum of the average voltage of the anode active material and the average voltage of the lead acid battery cell.

In accordance with certain embodiments of the present disclosure, the anode active material may be selected to have an average voltage that is considered to be higher than a carbon-based anode active material. Such high average voltages for the anode active material may discourage lithium plating at the anode, which can enhance the stability of the lithium ion cells 32. For example, it may be desirable to select an anode active material having an average voltage above approximately 0.5 V, such as above approximately 1.0V, for example between approximately 1 V and 2 V. Indeed, in embodiments where the anode active material has an average voltage in this range, lithium plating (which occurs at approximately 0 V) may be discouraged under a wide variety of operating conditions of the battery 30. Furthermore, this may reduce or eliminate the need for thermal management of the lithium ion battery cells 32.

The anode active material may generally include any one or a combination of materials, such as carbon (e.g., graphite), as well as lithium-titanium alloys. For example, in one embodiment, the anode active material may be graphite, which has an average voltage of less than 200 milliVolts (mV) versus $Li/Li^+$. However, in order to achieve enhanced stability against lithium plating, the anode active material may include a higher average voltage material, such as titanium dioxide (TiOx or otherwise denoted as $TiO_2$), or lithium titanium oxide, also referred to herein as LTO ($Li_4Ti_5O_{12}$). The anode active material may include any one or a combination of these and other active materials. Indeed, any anode active material may be used, such as anode active materials having an average voltage of less than approximately 3 V, such as between approximately 0.3 V and approximately 3 V, between approximately 1 V and approximately 2.5 V, or between approximately 1 V and approximately 2 V. The use of LTO may be desirable, as it has an average voltage of approximately 1.55 V, and operates well outside of the voltage range at which lithium plating generally occurs, even at lower temperatures (e.g., down to approximately −30° C.). Furthermore, the LTO may not undergo any major exothermic reactions with the electrolyte of the lithium ion battery cells 32, even at higher temperatures (e.g., up to approximately 170° C.).

The cathode active material may, in its most general sense, include any active material capable of undergoing the reversible process described above with respect to the cathode. In accordance with present embodiments, the cathode active material may be an active material that has an average voltage that, after subtracting the anode active material's average voltage, substantially matches the average voltage of the lead acid battery cells 34. By way of non-limiting example, the cathode active material (the one or more materials used to produce the cathode) may have an average voltage of at least approximately 3 V, such as between approximately 3 V and approximately 5 V, such as between approximately 3.0 V and approximately 4.9 V, between approximately 3.0 V and approximately 4.8 V, between approximately 3.0 V and approximately 4.7 V, between approximately 3.0 V and approximately 4.6 V, between approximately 3.1 V and approximately 4.5 V, between approximately 3.1 V and approximately 4.4 V, between approximately 3.2 V and approximately 4.3 V, between approximately 3.2 V and approximately 4.2 V, between approximately 3.2 V and approximately 4.1 V, or between approximately 3.2 V and approximately 4.0 V.

By way of example, the cathode active material may be a lithium metal oxide component. As used herein, lithium metal oxides may refer to any class of materials whose formula includes lithium and oxygen as well as one or more additional metal species (e.g., nickel, cobalt, manganese, aluminum, iron, or another suitable metal). A non-limiting list of example LMOs may include: mixed metal compositions including lithium, nickel, manganese, and cobalt ions such as lithium nickel cobalt manganese oxide (NMC) (e.g., $LiNi_{1/3}Co_{1/3}Mn_{1/3}O_2$), lithium nickel cobalt aluminum oxide (NCA) (e.g., $LiNi_{0.8}Co_{0.15}Al_{0.05}O_2$), lithium cobalt oxide (LCO) (e.g., $LiCoO_2$), and lithium metal oxide spinel (LMO-spinel) (e.g., $LiMn_2O_4$). The cathode may include only a single active material (e.g., NMC), or may include a mixture of materials such as any one or a combination of: NMC, NCA, LCO, LMO-spinel, and the like.

Other cathode active materials may be utilized in addition to or in lieu of these materials, such as lithium metal phosphates. Examples of such active materials are generally defined by the formula $LiMPO_4$, wherein M is Fe, Ni, Mn, or Mg. Any one or a combination of these phosphates may be used as the cathode active material, in addition to or in lieu of any one or a combination of the lithium metal oxide materials encompassed by the description above. Thus, the cathode active material may include any one or a combination of: NMC ($Li_xNi_aMn_bCo_cO_2$, x+a+b+c=2), $LiMn_2O_4$ (LMO) spinel, NCA ($LiNi_xCo_yAl_zO_2$, x+y+z=1), $LiMn_{1.5}Ni_{0.5}O_2$, $LiCoO_2$ (LCO), or $LiMPO_4$, wherein M is Fe, Ni, Mn, or Mg.

By way of example, in one embodiment, the cathode active material may be NMC, which has an average voltage that, when combined with an LTO anode active material, generates an average voltage for the lithium ion battery cells 32 that approximately matches the lead acid battery cells 34. For example, if the average voltage of LTO is approximately 1.55 V, and the average voltage of the lead acid battery cell 34 is approximately 2.2 V, then an appropriate cathode active material would have an average voltage that is approximately equal to, or is very near, 3.75 V (1.55 V+2.2 V). NMC is one such cathode active material, with LMO spinel and NCA also being appropriately close to the desired average voltage. It should be noted, however, that a variety of cathode active materials may, in combination, be used at the cathode to achieve an appropriate average voltage, as well.

FIGS. 9 and 10 each depict combined plots of charge and discharge profiles for a variety of lithium ion cells, and FIG. 9 also includes a charge and discharge profile for a lead acid battery cell. Specifically, FIG. 9 is a combined plot 100 of voltage as a function of percentage of capacity, at a charge and discharge rate of C/10 at 25° C., for an LMO/LTO lithium ion battery cell (i.e., a lithium ion battery cell that uses LMO as the cathode active material and LTO as the anode active material) during charging and discharging, an NMC/LTO lithium ion battery cell during charging and discharging, and a lead acid cell during charging and discharging.

As depicted in the combined plot 100, the charge/discharge voltage window for the NMC/LTO lithium ion battery cell is similar to the charge/discharge voltage window for the lead acid battery cell. Indeed, as can be seen from their respective charge and discharge profiles, the charge and discharge profiles for the NMC/LTO lithium ion battery cell generally follow the charge and discharge profiles for the lead acid battery cell, with the voltage of the NMC/LTO cell generally remaining within approximately 0.15 V and 0.2 V of the voltage of the lead acid battery cell. The charge/discharge voltage window for the NMC/LTO cell may be considered to be between approximately 1.6 V and approximately 2.8 V. As also depicted in FIG. 9, the LMO/LTO lithium ion battery cell has a charge/discharge voltage profile that is similar to the NMC/LTO lithium ion battery cell, but is on average approximately 0.15 V higher.

FIG. 10 is a combined plot 110 depicting charge/discharge voltage profiles obtained at a charge and discharge rate of C/10 at 25° C. for an NMC/graphite lithium ion cell and an NCA/graphite lithium ion cell, where the graphite is used as the anode active material, and the NMC and NCA are used as the cathode active materials in separate lithium ion cells. As is demonstrated by the profiles, when graphite is utilized as the anode active material, the resulting lithium ion battery cells that use NMC or NCA as the cathode active materials may not be substantially voltage matched with the lead acid battery cells. However, it should be appreciated that like the NMC/LTO lithium ion battery cell, a cell utilizing NCA as the cathode active material and LTO as the anode active material may also be substantially voltage matched with the lead acid battery cells. It should therefore be appreciated that the lithium ion battery cells can be voltage-tailored using a variety of materials in order to achieve substantial voltage matching between the lithium ion cells 32 and the lead acid battery cells 34.

In addition to the benefits noted above with respect to the use of LTO as the anode active material (or similar material having a similar average voltage), using LTO may also reduce impedance of the lithium ion battery cells 32 compared to carbon-based anode active materials. FIGS. 11-13 depict area specific impedance (ASI) as a function of depth of discharge percentage obtained via hybrid pulse power characterization (HPPC) experiments run at 25° C. for two NMC/graphite lithium ion battery cells, three NMC/LTO lithium ion battery cells, and three LMO/LTO lithium ion battery cells, respectively. The impedance calculations from the HPPC are based on 5C discharge and 3.75C charge pulses for 10 seconds. All of these different types of lithium ion battery cells may be utilized in accordance with present embodiments. However, as discussed above and in further detail below, in certain embodiments, it may be desirable to use LTO-based anode active materials in the lithium ion battery cells 32.

FIG. 11, which is a plot 120 of ASI versus depth of discharge percentage for the NMC/graphite lithium ion cell, demonstrates ASI values ranging generally between approximately 35 Ohms-squared centimeters ($\Omega^*cm^2$) and approximately 40 $\Omega^*cm^2$ for a large depth of discharge range of these cells. FIG. 12, which is a plot 130 of ASI versus depth of discharge percentage for the NMC/LTO lithium ion cells, demonstrates that these cells generally have ASI values ranging generally between approximately 15 $\Omega^*cm^2$ and approximately 30 $\Omega^*cm^2$ at a large range of depth of discharge percentages. FIG. 13 depicts a similar plot 140 of ASI versus depth of discharge percentage for the three LMO/LTO lithium ion cells, and demonstrates that the LMO/LTO lithium ion cells generally have ASI values ranging generally between approximately 15 $\Omega^*cm^2$ and approximately 30 $\Omega^*cm^2$ at depth of discharge percentages. Comparing, for example, the ASI values at 50% state of charge (depth of discharge percentage), it can be clearly seen that the NMC/LTO lithium ion battery cells (approximately 19 $\Omega^*cm^2$, approximately 18 $\Omega^*cm^2$, and approximately 16.5 $\Omega^*cm^2$, for the first, second, and third tested NMC/LTO cells, respectively) generally have a much lower impedance than the two tested NMC/graphite lithium ion battery cells (which have ASI values of approximately 35 $\Omega^*cm^2$ and approximately 38 $\Omega^*cm^2$), and the LMO/LTO lithium ion battery cells also generally have a much lower impedance than the NMC/graphite lithium ion battery cells (approximately 23 $\Omega^*cm^2$, approximately 23 $\Omega^*cm^2$, and approximately 17 $\Omega^*cm^2$, for the first, second, and third tested LMO/LTO cells, respectively). Accordingly, the NMC/LTO and LMO/LTO-based lithium ion battery cells may be considered to have superior discharging capability compared to the NMC/graphite lithium ion battery cells.

The lithium ion battery cells 32 may also include components in addition to the electrodes, such a including, but not limited to, a separator that maintains physical separation between the cathode 78 and the anode 76, and various additives provided as part of the electrolyte. The electrolyte may also be referred to as an electrolyte mixture that includes a solvent (e.g., a non-aqueous solvent), additives, and one or more lithium salts that act as a lithium ion source. Example separators include polypropylene (PP), polyethylene (PE), PP/PE/PP trilayers, ceramic coated PP or PE or trilayers, pure ceramic layer separators, cellulose-based separators, or ceramic filled PP or PE-based separators, or any combination thereof. Other separators will be apparent to those of skill in the art and are within the scope of the present disclosure.

Any source of lithium ions may be used in the electrolyte, and will be readily apparent to those of ordinary skill in the art. The source may be a lithium salt, and may include any one or a combination of: lithium hexafluorophosphate ($LiPF_6$), lithium tetrafluororborate ($LiBF_4$), lithium bis(oxalato)borate ($LiB(C_2O_4)_2$ or LiBOB), lithium bis(perfluroroethylenesulfonyl)imide ($LiN(SO_2C_2F_5)_2$ or LiBETI), lithium bis(trifluoromethanesulfonyl)imide ($LiN(SO_2CF_3)_2$ or LiTFSI), or any other similar salt.

In addition, the electrolyte mixture will also generally include one, two, three, or more solvents (e.g., non-aqueous solvents) and optional additives to facilitate ion transfer and electrode stability. By way of example, such solvents may include alkyl esters, cyclic alkyl carbonates, non-cyclic alkyl carbonates, vinyl carbonates, and mixtures thereof. Specific solvents may include, but are not limited to, straight chain alkyl carbonate, a cyclic carbonate, a straight chain ester, a cyclic ester, or any combination thereof. By way of example, such solvents may include, but are not limited to, ethylene carbonate (EC), diethylcarbonate (DEC), dimethylcarbonate (DMC), propylene carbonate (PC), ethylmethylcarbonate (EMC), gamma-butyrolactone (GBL), methyl butyrate (MB), ethyl propionate (EP), and similar solvents.

Additives may include borates, carbonates, and the like, such as fluorinated carbonates, cyclic carbonates, fluorinated borates, sultones, sulfones, thiolanes, and the like. More specific examples may include, but are not limited to, fluroroethylene carbonate (FEC), vinylene carbonate (VC), vinylene fluorocarbonate (VFC), LiBOB, fluorinated LiBOB (e.g., $LiC_2O_4BF_2$), propane sultone (PS), propane sulfone, biphenyl, dioxathiolane 2,2-dioxide (DTD), cyclohexylpyrrolidone (CHP), or any combination thereof.

Any combination of the materials discussed above may be used in one or more of the lithium ion battery cells 32. Thus, generally, any one or a combination of the cathode active materials described above may be used in combination with any one or a combination of the anode active materials described above, and these may in turn be used in combination with any one or a combination of the lithium salts, additives, separators, and solvents described above. By way of example only, some non-limiting examples of lithium ion battery cell materials are provided herein.

In one general example embodiment, at least one of the lithium ion battery cells 32 may include one or more anode active materials that produce an anode having an average voltage of at least approximately 0.5 V, such as between approximately 1.0 V and approximately 2.0 V. The at least one lithium ion battery cell 32 may further include one or more cathode active materials that, together, produce a cathode having an average voltage that is substantially the same as the sum of the average voltage of the anode active material and the average voltage of the lead acid battery cell. Thus, the cathode active material may have an average voltage of at least approximately 2.7 V (at least approximately 0.5 V plus approximately 2.2 V for the lead acid battery cell), such as between approximately 3.2 V and approximately 4.2 V (between approximately 1.0 V and approximately 2.0 V plus approximately 2.2 V for the lead acid battery cell). This at least one lithium ion battery cell may also include a lithium salt dissolved within at least one non-aqueous solvent, such as a liquid mixture of at least an organic ester and an organic carbonate. This example lithium ion battery cell may further include at least one additive, such as an organic carbonate and an additional lithium salt, as well as at least one separator.

By way of more specific example, in one embodiment, the lithium ion battery cell may include a cathode active material that includes NCA, NMC, lithium metal phosphate, or LMO, or any combination thereof, and an anode active material that includes LTO, titanium dioxide (TiOx or $TiO_2$), or graphite, or any combination thereof. This lithium ion battery cell may further include $LiPF_6$, $LiBF_4$, $LiB(C_2O_4)_2$ (LiBOB), $LiN(SO_2C_2F_5)_2$ (LiBETI), $LiN(SO_2CF_3)_2$ (LiTFSI), or any combination thereof, as the lithium salt, and FEC, VC, VFC, LiBOB, fluorinated LiBOB (including $LiC_2O_4BF_2$), PS, ES, biphenyl, CHP, DTD, or any combination thereof, as an additive, and PP, PE, PP/PE/PP trilayers, ceramic coated PP or PE or trilayers, a pure ceramic layer separator, a cellulose based separator, or a ceramic filled PP or PE based separator, or any combination thereof, as the separator.

In an even more specific, but non-limiting example, the lithium ion battery cell may include NMC as the cathode active material, and LTO as the anode active material. This more specific lithium ion battery cell may include $LiPF_6$ as the lithium salt, LiBOB and VC as additives, and a mixture of propylene carbonate (PC) and gamma butyrolactone (GBL) as the solvent, and using a cellulose-based separator. In a still further embodiment, the LiBOB and VC may not be present.

Again, the lithium ion battery cells that are produced in accordance with the present disclosure may, in some embodiments, be substantially voltage-matched with the lead acid cells to which they are electrically coupled in parallel. By way of non-limiting example, the lithium ion battery cell may have an average voltage of between approximately 1.9 V and approximately 2.5 V, such as between approximately 2.0 V and approximately 2.4 V, or between approximately 2.1 V and approximately 2.3 V. This may enable, as discussed above, charge balancing between the lithium ion battery cells and the lead acid battery cells, and also enables protection of the lithium ion battery cell during overdischarging and overcharging by the lead acid battery cell.

As discussed above, this may reduce or altogether eliminate the need for the incorporation of battery management systems (BMS's). In addition, the enhanced thermal stability afforded by certain anode active materials (e.g., LTO), which may have a higher average voltage compared to carbon-based anode materials such as graphite, may greatly reduce the reliance of the battery 30 on external thermal management. However, the batteries 30 produced in accordance with the present disclosure may be used in combination with a BMS and thermal management features, as disused below.

Battery Management and Thermal Management

While the present disclosure encompasses embodiments where the battery 30 includes no BMS, and little to no external thermal management monitoring and control, in some embodiments, the battery 30 may include these features. For example, FIG. 14 depicts a simplified schematic of an embodiment of the battery 30, in a 12 V arrangement (though the battery 30 may be of any suitable voltage), that includes a battery management system 150 configured to at least partially manage the operation of the battery 30.

Specifically, the BMS 150 of the illustrated embodiment may include, among other things, voltage control circuitry 152, one or more voltage sensors 154 (e.g., voltmeters), one or more tangible, non-transitory, machine-readable media serving as memory 156, one or more processing devices 158 such as a field programmable gate array (FPGA) or a standard programmable chipset having partitioned memory, one or more temperature sensors 160 (e.g., resistors, thermocouples), and an active thermal control system 162. The memory and processing devices 156, 158 may be a part of, or may be coupled to, a CANbus processing system of a vehicle.

It should be noted that these components are not exhaustive, and that there may be additional devices or other modules associated with the BMS 150. Further, the above components are depicted as being connected to the BMS 150 via dashed lines. This is intended to denote that any one or a combination of these components may be incorporated into the BMS 150, or may be external to the BMS 150 but in communication (e.g., wired or wireless communication) with the BMS 150. Furthermore, although the BMS 150 is illustrated as being disposed within the housing 38 of the battery 30, in other embodiments, the BMS 150 may be external to the housing 38 of the battery 30 (e.g., may be a part of a vehicle or other system that utilizes the battery 30).

As discussed above, because of the parallel electrical connection between each lithium ion battery cell with a lead acid battery cell, the lithium ion battery cells may be charge-balanced without external control from electronic control circuitry. Therefore, in some embodiments of the present disclosure, the BMS 150, unlike traditional BMS's incorporated into existing lithium ion batteries, may only manage the battery 30 as a unit, as opposed to managing the battery 30 by controlling individual cells. In this way, the BMS 150 may control the plurality of battery cell assemblies as a single unit, such that any adjustments made by the BMS 150 are made to the entire battery 30 (e.g., all of the battery cell assemblies).

For example, the BMS 150 may include only one voltage sensor 154 that obtains a voltage across the entire series connection of the battery cell assemblies 36. Additionally or alternatively, the BMS 150 may include a plurality (two or more) voltage sensors 154 that are each configured to monitor a voltage across one battery cell assembly 36, or across a collection of battery cell assemblies 36 (e.g., as in FIG. 6. The measured voltages may, in certain embodiments, also be used to determine the temperature of the individual cell assemblies 36 and/or to the temperature of the entire battery 30, for example using one or more resistors (e.g., variable resistors having a known relationship between resistance and temperature).

The voltage control circuitry 152 of the BMS 150 may include one or more switches, such as transistors (e.g., metal oxide semiconductor field effect transistors MOSFETS) that act to enable an additional supply of charge when the measured voltage or voltages fall below a lower threshold of the battery 30 or cell assemblies 36, or operate to drain charge when the measured voltage or voltages rise above an upper threshold of the battery 30 or cell assemblies 36. The voltage control circuitry 152 may be in communication with the voltage sensors 154, or may be in communication with the temperature sensors 160 in order to obtain feedback that causes the voltage circuitry to supply or drain voltage.

The control by the voltage control circuitry 152 may be automatic (e.g., without control from external processing devices), or may be a result of monitoring algorithms run by the processing devices 158 based on instructions stored on the memory devices 156. For example, the memory devices 156 may store lookup tables associated with appropriate responses, and the processing devices 158 may carry out the appropriate responses (e.g., draining or supplying voltage) based on a match between feedback obtained from the voltage and/or temperature sensors 154, 160 and the stored response. The memory devices 156 may also store voltage and temperature correlations that relate a monitored parameter (e.g., voltage, resistance, temperature, current) to another parameter (e.g., voltage, resistance, temperature, current). Again, this monitoring and control may be performed for the entire battery 30 as a unit, rather than on a cell-by-cell basis, which greatly reduces the cost associated with the various different types of sensors and voltage control circuitry described herein.

The active thermal control system 162 may be in communication with the BMS 150, or in other embodiments, may be a standalone feature associated with the battery 30. The active thermal control 162 may include heaters (e.g., resistive heaters) and/or cooling devices (e.g., heat exchange circuits that carry a heat exchange medium, heat rejection fans, and the like) that are activated automatically by one or more voltage or current-based switches, by the memory and processing devices 156, 158 based on one or more sets of stored instructions that are executable as algorithms, or a combination thereof. Again, the active thermal control system 162 may monitor and control temperature based on feedback obtained from the temperature sensors 160 that may monitor the temperature of the entire battery 30, rather than individual cells.

Therefore, the lithium ion battery cells 32 may not each be coupled directly to a thermal sensor or a voltage sensor, such that their individual temperatures and voltages are not directly monitored. However, while such monitoring and control may not be necessary, it is within the scope of the present disclosure to provide full battery management and thermal control for each lithium ion battery cell, each lead acid battery cell, and/or each battery cell assembly 36. Indeed, any combination of individual monitoring, individual control, collective monitoring, and collective control, is within the scope of the present disclosure. Furthermore, the BMS 150 may also run monitoring algorithms that enable diagnostics of the lithium ion and lead acid portions of the battery 30 in substantially real time. For example, the BMS 150 may monitor the cranking of an engine enabled by the battery to determine the state of the lead acid battery cells, and the BMS 150 may monitor charge retention, impedance, temperature, and similar properties, to determine the state of the lithium ion battery cells. In this way, the BMS 150 may be able to detect the onset of battery failure well before the cells are no longer viable.

Battery Manufacturing

FIG. 15 is a process flow diagram depicting an embodiment of a method 170 for producing a battery in accordance with the present disclosure. The method 170 may be used to produce any one or a combination of the batteries 30 described above, depending on the particular implementation of the battery 30. The method 170 may include obtaining (block 172) one or more lead acid battery cells (e.g., lead acid battery cells 34). The acts represented by block 172 may include simply purchasing the lead acid battery cells, or constructing the lead acid battery cells using the materials described above with respect to the construction and materials of the lead acid battery cells, or similar materials having similar or the same function and capabilities (e.g., similar or the same electrochemical properties). It should be noted that the acts according to block 172 may also include, in one embodiment, removing one or more lead acid battery cells from existing lead acid batteries, testing the one or more lead acid battery cells to determine whether they meet a predetermined criterion, and using any appropriate lead acid battery cells from the existing lead acid battery in the method 170 described herein. In this way, the method 170 also encompasses retrofitting and/or remanufacturing using existing lead acid battery cells.

The method 170 may also include obtaining (block 174) one or more lithium ion battery cells (e.g., the lithium ion battery cells 32) that substantially voltage match the lead acid battery cells. The acts according to block 174 may include purchasing appropriate lithium ion battery cells that each have an average voltage that is a substantial match with (e.g., within approximately 0.3 V of) the average voltage of each lead acid battery cell, or may include building an appropriate cell using the example materials as described above with respect to the lithium ion battery cells. As one example, when the acts according to block 174 include building appropriate lithium ion battery cells, the method 170 may include selecting an anode active material and a cathode active material that produce a lithium ion cell having an average voltage that is a substantial voltage match with the lead acid battery cells. Examples of such materials are described above.

As with the lead acid battery cells, the acts according to block 174 may also include, in one embodiment, removing one or more lithium ion battery cells from existing lithium ion batteries, testing the one or more lithium battery cells to determine whether they meet a predetermined criterion, and using any appropriate lithium ion battery cells from the existing lithium ion battery in the method 170 described herein. In this way, the method 170 also encompasses retrofitting and/or remanufacturing using existing lithium ion battery cells (i.e., lithium ion battery cells previously incorporated into lithium ion batteries), either in addition to or in lieu of lead acid battery cells previously incorporated into lead acid batteries.

The method 170 may also include, as described in detail above, coupling (block 176) the lithium ion battery cells and the lead acid battery cells electrically in parallel to produce battery cell assemblies (e.g., battery cell assemblies 36). As described above with respect to FIGS. 3-6, the parallel connection between the lithium ion and the lead acid battery cells may be such that each of the battery cell assemblies has a ratio of lithium ion to lead acid battery cells of 1:1, 2:1, or 1:2, or any other appropriate ratio that enables the charge balancing and lithium ion protection described herein, which may be based, at least in part, on voltage matching between the lithium ion battery cells and the lead acid battery cells.

The method 170 may further include coupling (block 178) the battery cell assemblies electrically in series and/or parallel. As described above, the voltage of the battery may be determined by the total voltage of the battery cell assemblies connected in series, while current output may be increased by electrically coupling battery cell assemblies in parallel. It should be noted that the battery cell assemblies may also be electrically coupled and formed at substantially the same manufacturing step, for example by connecting the lithium ion battery cells in series, and then connecting each of the lithium ion battery cells electrically in parallel with a lead acid battery cell. Indeed, in one such embodiment, the method 170 may include connecting the lead acid battery cells of a full lead acid battery electrically in parallel with the lithium ion battery cells of a full lithium ion battery.

The method 170 may further include enclosing (block 180) the battery cell assemblies, or the individual cells, or collections of lithium ion cells and collections of lead acid battery cells, with one or more housings. For example, the battery 30 may include any one or a combination of the enclosure schemes described above with respect to FIG. 6.

The method 170 may also include other refinement steps that are not specifically illustrated in FIG. 15. Such refinement steps may include attaching terminals, reinforcing electrical connections, and so on.

The method 170 may also include connecting a battery management system (e.g., the BMS 150), a thermal management system (e.g., active thermal control system 162), or a combination thereof, to the battery 30. While these features may be included as attached to or incorporated within the battery during the manufacturing process depicted by FIG. 15, it should be appreciated that such features may be attached to the battery 30 at an entirely different stage, such as at a time of incorporating the battery into a vehicle.

One or more of the disclosed embodiments, alone or on combination, may provide one or more technical effects useful in the production of lead acid/lithium ion dual storage batteries having inherent overcharging and overdischarging protection. For example, certain embodiments of the present approach may enable reduced costs associated with the manufacture of such batteries, such as by reducing or eliminating the need for a battery management system. In addition, certain embodiments of the present approach also enable the production of lead acid/lithium ion dual storage batteries that can operate under a wide range of temperatures, enabling their use without significant thermal control devices. The approaches described herein may also provide battery modules with the higher power densities and charge rates associated with lithium ion batteries, while also providing the high discharge rates and inherent overcharging and overdischarging protection associated with lead acid batteries. The technical effects and technical problems in the specification are exemplary and are not limiting. It should be noted that the embodiments described in the specification may have other technical effects and can solve other technical problems.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation. Further, although individual embodiments are discussed herein, the disclosure is intended to cover all combinations of these embodiments.

The invention claimed is:

1. A battery, comprising:
   a plurality of lithium ion battery cells; and
   a plurality of lead acid battery cells; and
   wherein each individual lithium ion battery cell of the plurality of lithium ion battery cells is electrically coupled in parallel with and substantially voltage matched with a corresponding individual lead acid battery cell of the plurality of lead acid battery cells such that the battery comprises a plurality of lithium ion/lead acid battery cell pairs, and wherein the plurality of lithium ion battery cells as a unit is communicatively coupled to a battery management system, and wherein the battery is configured to undergo charge balancing during operation without the electronic battery management system.

2. The battery of claim 1, wherein the battery is an automotive battery and is integrated into the framework of a vehicle, and the vehicle is an xEV.

3. The battery of claim 2, wherein the battery is configured to operate within the vehicle without being controlled by the battery management system.

4. The battery of claim 2, wherein the battery has a voltage of less than 60 V.

5. The battery of claim 2, wherein the battery is configured to operate within the vehicle without active thermal control.

6. The battery of claim 1, wherein at least one lithium ion battery cell of the plurality of lithium ion battery cells comprises:
   a cathode comprising a cathode active material, wherein the cathode active material comprises any one or a combination of: NMC ($Li_xNi_aMn_bCo_cO_2$, x+a+b+c=2), $LiMn_2O_4$ (LMO) spinel, NCA ($LiNi_xCo_yAl_zO_2$, x+y+z=1), $LiMn_{1.5}Ni_{0.5}O_2$, $LiCoO_2$ (LCO), or $LiMPO_4$, wherein M is Fe, Ni, Mn, Mg;
   an anode comprising an anode active material, wherein the anode active material comprises any one or a combination of: $Li_4Ti_5O_{12}$ (LTO), titanium dioxide ($TiO_x$ or $TiO_2$), or graphite; and
   an electrolyte mixture comprising a source of lithium salt ions and at least one non-aqueous solvent, wherein the at least one non-aqueous solvent comprises a straight chain alkyl carbonate, a cyclic carbonate, a straight chain ester, a cyclic ester, or any combination thereof.

7. The battery of claim 6, wherein the cathode active material comprises NMC and the anode active material comprises LTO.

8. The battery of claim 1, wherein at least one lithium ion battery cell of the plurality of lithium ion battery cells comprises a cathode comprising a cathode active material, and an anode comprising an anode active material, wherein the cathode active material has an average voltage approximately equal to a sum of an average voltage of the anode active material and an average voltage of the corresponding individual lead acid battery cell to which the at least one lithium ion battery cell is electrically coupled in parallel.

9. The battery of claim 8, wherein the average voltage of the anode active material is between approximately 1 V and approximately 2 V, and the average voltage of the cathode active material is between approximately 3.2 V and 4.2 V.

* * * * *

UNITED STATES PATENT AND TRADEMARK OFFICE
CERTIFICATE OF CORRECTION

PATENT NO. : 9,812,732 B2
APPLICATION NO. : 14/106663
DATED : November 7, 2017
INVENTOR(S) : Junwei Jiang It is certified that error appears in the above-identified patent and that said Letters Patent is hereby corrected as shown below:

In the Specification

Column 1, Line 42, delete "systems" and insert -- electric vehicles --, therefor.

Column 1, Line 45, delete "systems" and insert -- electric vehicles --, therefor.

Column 3, Line 5, delete "DRAWINGS" and insert -- BRIEF DESCRIPTION OF DRAWINGS --, therefor.

Column 20, Line 31, delete "hexaflurorophosphate" and insert -- hexafluorophosphate --, therefor.

Column 20, Line 32, delete "tetrafluororborate" and insert -- tetrafluoroborate --, therefor.

Column 20, Lines 33-34, delete "bis(perfluroroethylenesulfonyl)imide" and insert
-- bis(trifluoromethanesulfonyl)imide --, therefor.

Column 20, Line 55, delete "fluroroethylene carbonate" and insert -- fluoroethylene carbonate --, therefor.

Column 22, Line 65, delete "FIG. 6." and insert -- FIG. 6). --, therefor.

In the Claims

Column 26, Lines 63-64, Claim 6, delete "comprising a source of lithium salt ions" and insert
-- comprising a lithium salt --, therefor.

Signed and Sealed this
Nineteenth Day of June, 2018

Andrei Iancu
*Director of the United States Patent and Trademark Office*